United States Patent
Dohta

(10) Patent No.: US 7,656,407 B2
(45) Date of Patent: Feb. 2, 2010

(54) IMAGE PROCESSING PROGRAM AND IMAGE PROCESSING APPARATUS

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 523 days.

(21) Appl. No.: 11/194,483

(22) Filed: Aug. 2, 2005

(65) Prior Publication Data

US 2006/0038813 A1    Feb. 23, 2006

(30) Foreign Application Priority Data

Aug. 18, 2004  (JP) .............................. 2004-238636

(51) Int. Cl.
*G06T 13/00* (2006.01)

(52) U.S. Cl. ................. 345/473; 345/441; 345/474; 345/475; 382/276; 382/277

(58) Field of Classification Search .................. 345/420
See application file for complete search history.

(56) References Cited

U.S. PATENT DOCUMENTS

| | | | |
|---|---|---|---|
| 6,320,988 B1 | 11/2001 | Yamaguchi et al. | |
| 6,342,886 B1 * | 1/2002 | Pfister et al. | 345/424 |
| 6,476,804 B1 * | 11/2002 | Costabel | 345/419 |
| 6,760,040 B2 | 7/2004 | Oka | |
| 7,091,977 B2 * | 8/2006 | Jeong et al. | 345/473 |

| | | | |
|---|---|---|---|
| 2006/0044311 A1 * | 3/2006 | Dohta | 345/441 |

FOREIGN PATENT DOCUMENTS

| | | | |
|---|---|---|---|
| JP | 9-73549 | | 3/1997 |
| JP | 09073549 A | * | 3/1997 |
| JP | 10-69549 | | 3/1998 |
| JP | 10-208072 A | | 8/1998 |
| JP | 2000-105665 A | | 4/2000 |
| JP | 2002-140725 A | | 5/2002 |

OTHER PUBLICATIONS

Hughes-Hallett et al., "Calculus", 1994, John Wiley and Sons, Inc., pp. 560-563.*

(Continued)

*Primary Examiner*—Kee M Tung
*Assistant Examiner*—Jwalant Amin
(74) *Attorney, Agent, or Firm*—Nixon & Vanderhye P.C.

(57) ABSTRACT

Between two apexes of a shape model associated with each other, a virtual spring for applying, to the two apexes, a virtual force which is directed in each of coordinate axis directions in a rectangular coordinate system and which is changed in magnitude in accordance with a distance between the two apexes in the coordinate axis direction is set. When positional relationship between the apexes of the shape model is changed from that of a reference state, the game apparatus calculates a difference between the post-change distance between the two apexes and the distance therebetween in the reference state for each of coordinate components. Then, the game apparatus calculates a magnitude of a virtual force generated by each of virtual springs based on the difference; and calculates a virtual force received by each apex for each coordinate component by adding parallel forces among the virtual forces applied to each apex.

10 Claims, 27 Drawing Sheets

OTHER PUBLICATIONS

Shanks et al., "Calculus Analytic Geometry Elementary functions", 1973, Holt, Rinehart And Winston, Inc., pp. 129-131.*

Title: Work, Author: Montgomery college, Date: Apr. 8, 2003, Source: http://web.archive.org/web/20030408034134/http://www.montgomerycollege.edu/Departments/scilcgt/work.pdf.*

Title: Adaptive Meshes and Shells: Irregular Triangulation, Discontinuities, and Hierarchical Subdivision, Author: Vasilescu et al., pp. 829-832, Date: Jun. 1992, Publisher: Proceedings of IEEE Computer Vision and Pattern Recognition Conference (CVPR '92).*

Kota Azuma, The 41st "Lecture on BASIC Programming for Students and Teachers," Mycom BASIC Magazine, Japan, DEMPA SHINBUN, Co. Ltd., Sep. 1, 1995, vol. 41, No. 9, pp. 68-71, together with partial English translation.

* cited by examiner

Conventional Art

FIG. 10
FIG. 11
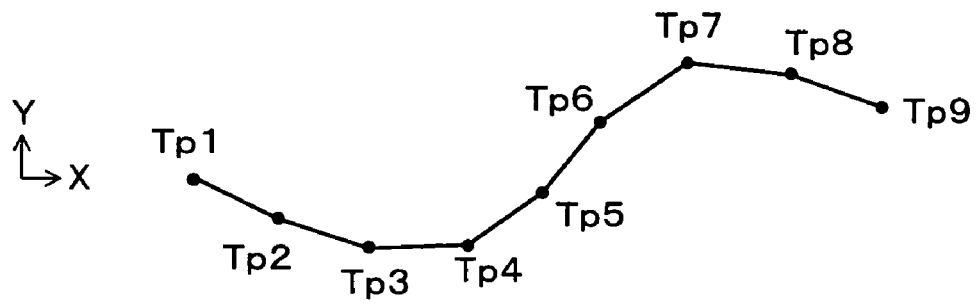
FIG. 12
| TP1 | Xt1 | Yt1 |
|---|---|---|
| TP2 | Xt2 | Yt2 |
| ⋮ | ⋮ | ⋮ |
| TPm | Xtm | Ytm |

FIG. 15

| C | P1 | X1 | Y1 |
|---|----|----|----|
|   | P2 | X2 | Y2 |
|   | ⋮  | ⋮  | ⋮  |
|   | Pn | Xn | Yn |

FIG. 17

| P1 | P2 | ΔX1 | ΔY1 |
|---|---|---|---|
| P2 | P3 | ΔX2 | ΔY2 |
| ⋮ | ⋮ | ⋮ | ⋮ |
| Pn-1 | Pn | ΔXn-1 | ΔYn-1 |

FIG. 20

| P1 | P1 | ΔXc1 | ΔYc1 |
|----|----|------|------|
| P1 | P2 | ΔXc2 | ΔYc2 |
| ⋮ | ⋮ | ⋮ | ⋮ |
| P1 | Pn | ΔXcn | ΔYcn |

FIG. 22

| P1 | Fx1 | Fy1 |
|----|-----|-----|
| P2 | Fx2 | Fy2 |
| ⋮  | ⋮   | ⋮   |
| Pn | Fxn | Fyn |

FIG. 25

| P1 | Vx1 | Vy1 |
|----|-----|-----|
| P2 | Vx2 | Vy2 |
| ⋮  | ⋮   | ⋮   |
| Pn | Vxn | Vyn |

FIG. 3.1A PRIOR ART
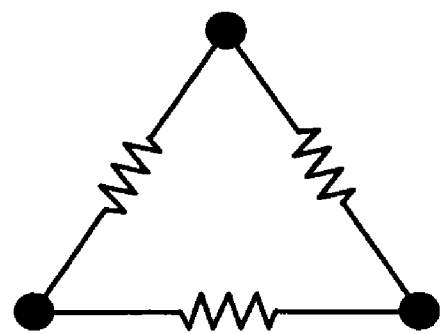
FIG. 31B PRIOR ART
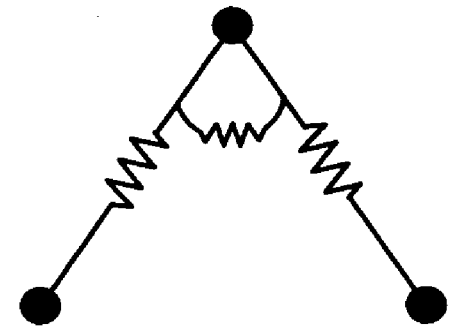

IMAGE PROCESSING PROGRAM AND IMAGE PROCESSING APPARATUS

BACKGROUND

1. Field of the Technology

The present technology relates to an image processing program and an image processing apparatus, and more specifically to an image processing program and an image processing apparatus for associating apexes which form a drawing such as a graphic, a letter or the like to each other by a virtual spring and displaying how the drawing is deformed.

2. Description of the Background Art

In conventional image processing, a spring is set between apexes of a model representing a graphic or a letter in order to naturally represent how the model is deformed.

For example, Japanese Laid-Open Patent Publication No. 9-73549 describes an image processing apparatus for setting a spring between apexes of a model and also setting a spring between an initial position of an apex and a post-movement position thereof. The image processing apparatus can naturally represent how the model is deformed when one point of the model is moved, using the above-mentioned two types of springs.

Japanese Laid-Open Patent Publication No. 10-69549 describes an image processing method for putting image data into a mesh of cells and setting a spring between apexes of the cells. This image processing method also sets a rotational spring at an angle made by the springs. This image processing method can naturally represent how the image is deformed.

The conventional image processing methods using springs described in Japanese Laid-Open Patent Publications Nos. 9-73549 and 10-69549 set springs so as to directly connect the apexes of a model (FIG. 31A and FIG. 31B). When using such a method to perform image processing for deforming the model, it is indispensable to calculate a distance between two points. This requires heavy calculation processing such as, for example, square root calculation or square calculation. In addition, the method described in Japanese Laid-Open Patent Publication No. 10-69549 sets a rotational spring as well as the spring connecting the apexes (FIG. 31B). This requires matrix calculation, which makes the processing heavier. As can be appreciated from the above, the conventional image processing methods have a problem that the load imposed on a game apparatus for performing image processing for model deformation is quite heavy. This is especially serious to mobile game devices and cellular phones having a low data processing capability.

SUMMARY

Therefore, a feature of an exemplary embodiment presented herein is to provide an image processing program and an image processing apparatus capable of performing model deformation processing using a spring with a light processing load.

The exemplary embodiment has the following features to attain the feature mentioned above. The reference numerals, additional explanations and the like in parentheses in this section of the specification indicate the correspondence with the embodiments described later for easier understanding of the exemplary embodiment and do not limit the exemplary embodiment in any way.

A first aspect of the exemplary embodiment is directed to a storage medium having an image processing program stored therein for causing a computer (CPU core 21, etc.) to execute processing of changing the shape of a shape model (31, 61) in a rectangular coordinate system and displaying the shape model on a screen of a display device (first LCD 11). The image processing program causes the computer to execute a difference calculation step (S102, S112), a spring force calculation step (S103, S104, S113), an apex force calculation step (S114), a position determination step (S92), and a display control step (S86). Each of apexes (P1 through P7) of the shape model is associated with at least one other apex of the shape model (first association list, second association list). Between two apexes associated with each other, a virtual spring (34 through 39, 41 through 46, 55 through 57) for applying, to the two apexes, a virtual force which is directed in each of coordinate axis directions (x axis direction, y axis direction) in the rectangular coordinate system and which is changed in magnitude in accordance with a distance between the two apexes in the coordinate axis direction is set. In the difference calculation step, when positional relationship between the apexes of the shape model is changed from that of a reference state, a difference (D, Dc) between the post-change distance between the two apexes and the distance therebetween in the reference state is calculated for each of coordinate components. In the spring force calculation step, a magnitude of a virtual force generated by each of virtual springs is calculated based on the difference. In the apex force calculation step, a virtual force (Fx, Fy) received by each apex from the corresponding virtual springs is calculated for each coordinate component by adding parallel forces among the virtual forces applied to each apex. In the position determination step, a position to which each apex is to be moved is determined for each coordinate component based on the virtual force calculated for each coordinate component in the apex force calculation step. In the display control step, the shape model obtained by moving each apex thereof to the determined position is displayed on the screen.

In a second aspect of the exemplary embodiment, the image processing program may cause the computer to further execute a control point designation step (S14) and a control point movement step (S83). In the control point designation step, at least one apex of the shape model is designated as a control point. In the control point movement step, the control point is moved. In this case, the difference calculation step calculates the difference generated by the movement of the control point.

In a third aspect of the exemplary embodiment, the image processing program may cause the computer to further execute a control point association step (S15). In the control point association step, when the control point is designated in the control point designation step, the control point and each apex of the shape model other than the control point are newly associated (second association list).

In a fourth aspect of the exemplary embodiment, the control point association step may perform the new association until the movement of the control point in the control point movement step is completed, or until deformation of the shape model caused by the movement of the control point is stopped.

In a fifth aspect of the exemplary embodiment, the image processing program may cause the computer to further execute an input detection step (S10) and a model creation step (S11). In the input detection step, a locus drawn by a user on an input plane of an input device is detected as coordinate points in time series. In the model creation step, the shape model having at least a part of the detected coordinate points as apexes is created.

In a sixth aspect of the exemplary embodiment, the input detection step may detect the coordinate points sequentially input by the player as a group of coordinate points. In this case, the model creation step creates the shape model including at least a part of the group of coordinate points detected in the input detection step as apexes and line segments connecting the apexes in time series. The image processing program may cause the computer to further execute an apex association step (S12). In the apex association step, a pair of apexes connected by a line segment among a plurality of pairs of apexes included in the shape model created in the model creation step are associated (first association list).

In a seventh aspect of the exemplary embodiment, the shape model may include a plurality of apexes and line segments connecting the apexes. In this case, the image processing program may cause the computer to farther execute an apex association step (S12). In the apex association step, when there is an apex in the shape model which cannot be reached by following the line segments from a predetermined apex, the apex which cannot be reached and an apex which can be reached by following the line segments from the predetermined apex are associated.

In an eighth aspect of the exemplary embodiment, the spring force calculation step may calculate a virtual force generated by each virtual spring based on a force having a magnitude in proportion to the difference ("spring force" of the virtual spring) and a force having a magnitude in proportion to a velocity of each apex (attenuation force applied to the virtual spring).

In a ninth aspect of the exemplary embodiment, the image processing program may cause the computer to further execute a reference distance calculation step (S52) and a post-movement distance calculation step (S101, S111). In the reference distance calculation step, the distance (ΔX, ΔXc) between the two apexes when the shape model is in the reference state is calculated for each coordinate component of the rectangular coordinate system. In the post-movement distance calculation step, the distance (ΔX', ΔXc') between the two apexes at a given time after the apexes are moved from the reference state is calculated for each coordinate component. In this case, the difference calculation step calculates the difference (D, Dc) based on the distance calculated in the reference distance calculation step and the distance calculated in the post-movement distance calculation step.

The exemplary embodiment presented herein may be provided in the form of an image processing apparatus (game apparatus 1) for executing the above-described image processing program.

According to the first aspect of the exemplary embodiment, between a pair of apexes associated with each other, a plurality of virtual springs, directed in each of coordinate axis directions and independent from each other, are set. Owing to this, the virtual force by each virtual spring and the position to which each apex is to moved can be calculated separately for each coordinate axis direction. As a result, heavy square calculations or square root calculations are not necessary. Therefore, model deformation processing using virtual springs can be executed at a light processing load.

According to the second aspect of the exemplary embodiment, the shape model can be easily moved by controlling the movement of the control point.

According to the third aspect of the exemplary embodiment, virtual springs are set between the control point and an apex other than the control point. Therefore, even an apex having a large number of connections from the control point (the number of lines connecting the control point and the apex; i.e., the number of line segments which need to be passed to reach the apex from the control point) can quickly respond to the movement of the control point. In other words, the compliancy to the deformation of the shape model can be improved.

According to the fourth aspect of the exemplary embodiment, virtual springs can be temporarily set between the control point and an apex other than the control point. Therefore, it is not necessary to set a large number of virtual springs between the apexes in advance. In other words, the virtual springs can be efficiently set, so that the compliancy to the deformation of the shape model can be improved with a minimum necessary number of virtual springs.

According to the fifth aspect of the exemplary embodiment, the graphic or letter which has been input by the user can be deformed like an elastic body.

According to the sixth aspect of the exemplary embodiment, the shape of the shape model can be determined and also the association between the apexes can be determined based on the input by the user. In other words, it can be determined which apexes of the shape model are to be associated with each other, based on the input by the user. Since the locus which is input by the user has a shape which can be drawn with one stroke, each apex of the shape model is associated with at least one other apex of the shape model. Therefore, the association between the apexes can be performed easily and accurately.

According to the seventh aspect of the exemplary embodiment, even in a shape model including a plurality of portions which are not integral with each other, the portions can be integrally deformed.

According to the eighth aspect of the exemplary embodiment, the virtual springs can be simulated more realistically.

According to the ninth aspect of exemplary embodiment, the extension of the virtual springs can be easily calculated. Since the distance between two apexes can be calculated separately for each coordinate component, the processing load on the computer can be alleviated.

These and other features, aspects and advantages of the exemplary embodiment presented herein will become more apparent from the following detailed description when taken in conjunction with the accompanying drawings.

BRIEF DESCRIPTION OF THE DRAWINGS

FIG. 10 shows an exemplary locus drawn by the player on a touch panel 13;

FIG. 11 shows input points read by the game apparatus 1 based on the inputs shown in FIG. 10;

FIG. 12 shows an exemplary input coordinate list;

FIG. 15 shows an exemplary apex list;

FIG. 17 is an exemplary first association list;

FIG. 20 shows an exemplary second association list;

FIG. 22 shows an exemplary spring force list;

FIG. 25 shows an exemplary velocity list;

FIG. 30A and FIG. 3GB are graphs illustrating the relationship between the extension of a virtual spring and time; and FIG. 31A and FIG. 31B show conventional methods for setting virtual springs.

DESCRIPTION OF THE PREFERRED EMBODIMENTS

Hereinafter, an image processing apparatus and an image processing program according to one embodiment will be described. Although a game apparatus including two display devices will be described in this embodiment as an exemplary image processing apparatus, the exemplary embodiment is applicable to any apparatus capable of executing an image processing program. For example, the image processing apparatus may be a game apparatus including one display device, an installation type personal computer, a mobile terminal such as a PDA, or the like.

Figure 1:
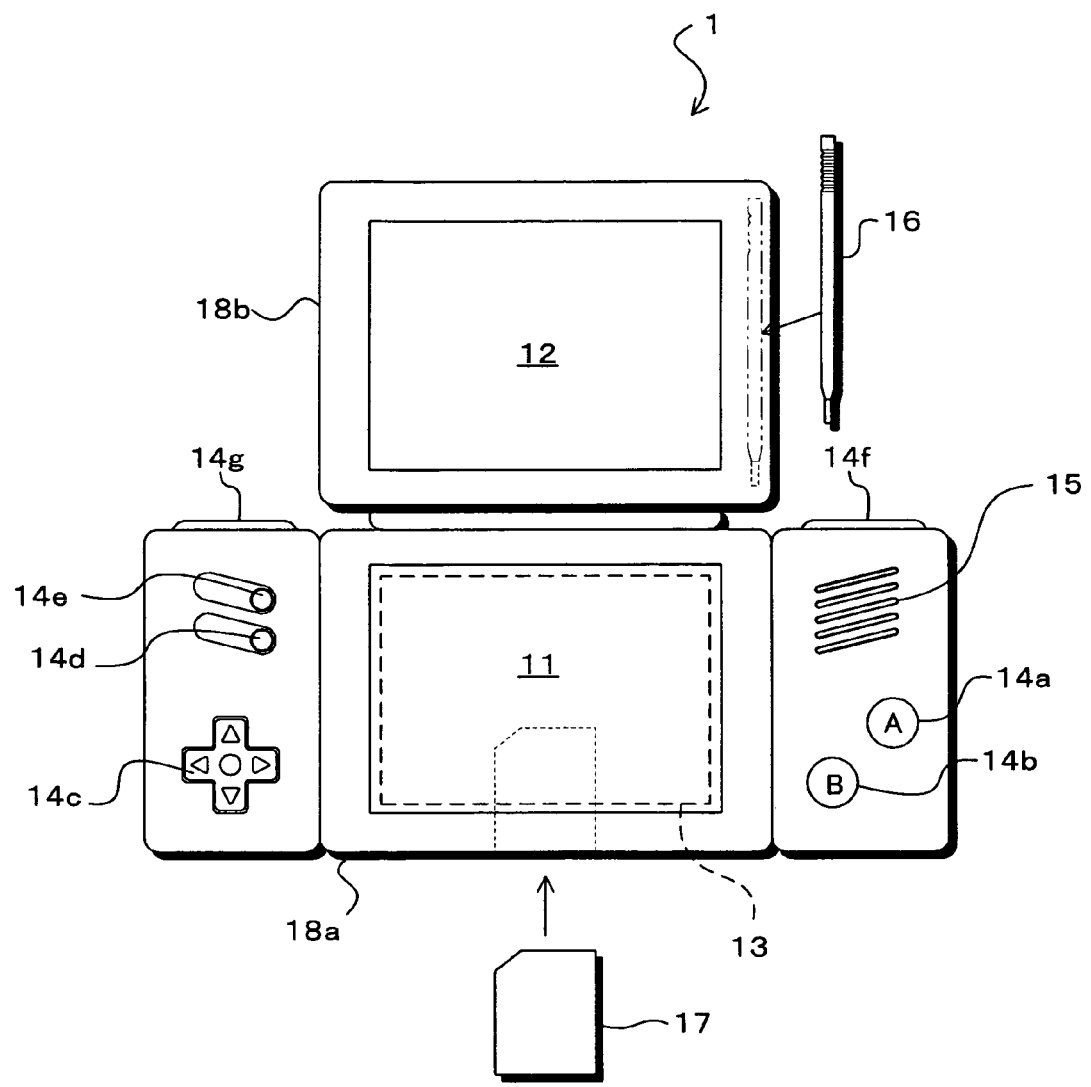
FIG. 1 is an external view of a mobile game apparatus 1 as an exemplary image processing apparatus according to one embodiment.

FIG. 1 is an external view of a mobile game apparatus 1 as an exemplary image processing apparatus according to one embodiment. In FIG. 1, the game apparatus 1 includes two liquid crystal displays (hereinafter, referred to as "LCDs") 11 and 12 which are accommodated in a housing at predetermined positions. Specifically, in the case where the LCD 11 (first LCD) and the LCD 12 (second LCD) are accommodated in a vertically stacking manner, the housing includes a lower housing 18a and an upper housing 18b. The upper housing 18b is pivotably supported by a part of an upper surface of the lower housing 18a. The upper housing 18b has a planar shape slightly larger than a planar shape of the second LCD 12, and has an opening for exposing a display screen of the second LCD 12 on one main surface thereof. The lower housing 18a has a planar shape longer in the horizontal direction than the planar shape of the upper housing 18b, and has an opening for exposing a display screen of the first LCD 11 at approximately the center of the lower housing 18b in the horizontal direction. One of two side sections of the lower housing 18a interposing the first LCD 11 has speaker holes of a speaker 15, and each of the two side sections has an operation switch section 14.

The operation switch section 14 includes an operation switch 14a and an operation switch 14b which are attached to one main surface of the side section of the lower housing 18a which is to the right of the first LCD 11 as seen in FIG. 1. The operation switch section 14 also includes a direction instruction switch 14c, a start switch 14d, and a select switch 14e which are attached to one main surface of the side section of the lower housing 18a to the left of the first LCD 11 as seen in FIG. 1. The operation switches 14a and 14b are used, for example, for inputting an instruction to jump, punch, move a weapon, etc. in an action game, and for inputting an instruction to obtain an item or to select and determine a weapon or a command, etc. in a roll playing game (RPG) or a simulation RPG. The direction instruction switch 14c is used for instructing a direction on a game screen, for example, for instructing a moving direction of a player object (or a player character) operable by the player (user) or for instructing a moving direction of a cursor. When necessary, the lower housing 18a may further include an additional operation switch(es), or side surface switches 14f and 14g which are respectively provided on upper surfaces of the side sections of the lower housing 18a to the left and to the right of the first LCD 11.

On a front surface of the first LCD 11, a touch panel 13 (surrounded by the dashed line in FIG. 1) is provided. The touch panel 13 is of, for example, any of a resistance film system, an optical (infrared) system, and a static capacitance coupling system. When a stylus 16 (or a finger) presses, moves on, or touches an upper surface (input surface) of the touch panel 13, the coordinate position of the stylus 16 is detected and the coordinate data is output.

In the vicinity of a side surface of the upper housing 18b, an accommodation hole (an area represented by the two-dot chain line in FIG. 1) is formed when necessary for accommodating the stylus 16 for operating the touch panel 13. The stylus is accommodated in the accommodation hole. In a part of one surface of the lower housing 18a, a cartridge insertion section (an area represented by the one-dot chain line in FIG. 1) is formed, for detachably accepting a game cartridge 17 having a built-in memory (e.g., a ROM) which stores a game program including a graphics identification program according to this embodiment. The cartridge 17 is an information storage medium for storing a game program, and is, for example, a nonvolatile semiconductor memory such as a ROM or a flash memory. A part of the lower housing 18b inner to the cartridge insertion section has a built-in connecter (see FIG. 2) to be electrically connected with the cartridge 17. The lower housing 18a (or the upper housing 18b) accommodates an electronic circuit board having various electronic components such as a CPU and the like mounted thereon. The storage medium for storing the game program is not limited to the nonvolatile semiconductor memory, but may be a CD-ROM, a DVD, or a similar optical disc-shaped storage medium.

Figure 2:
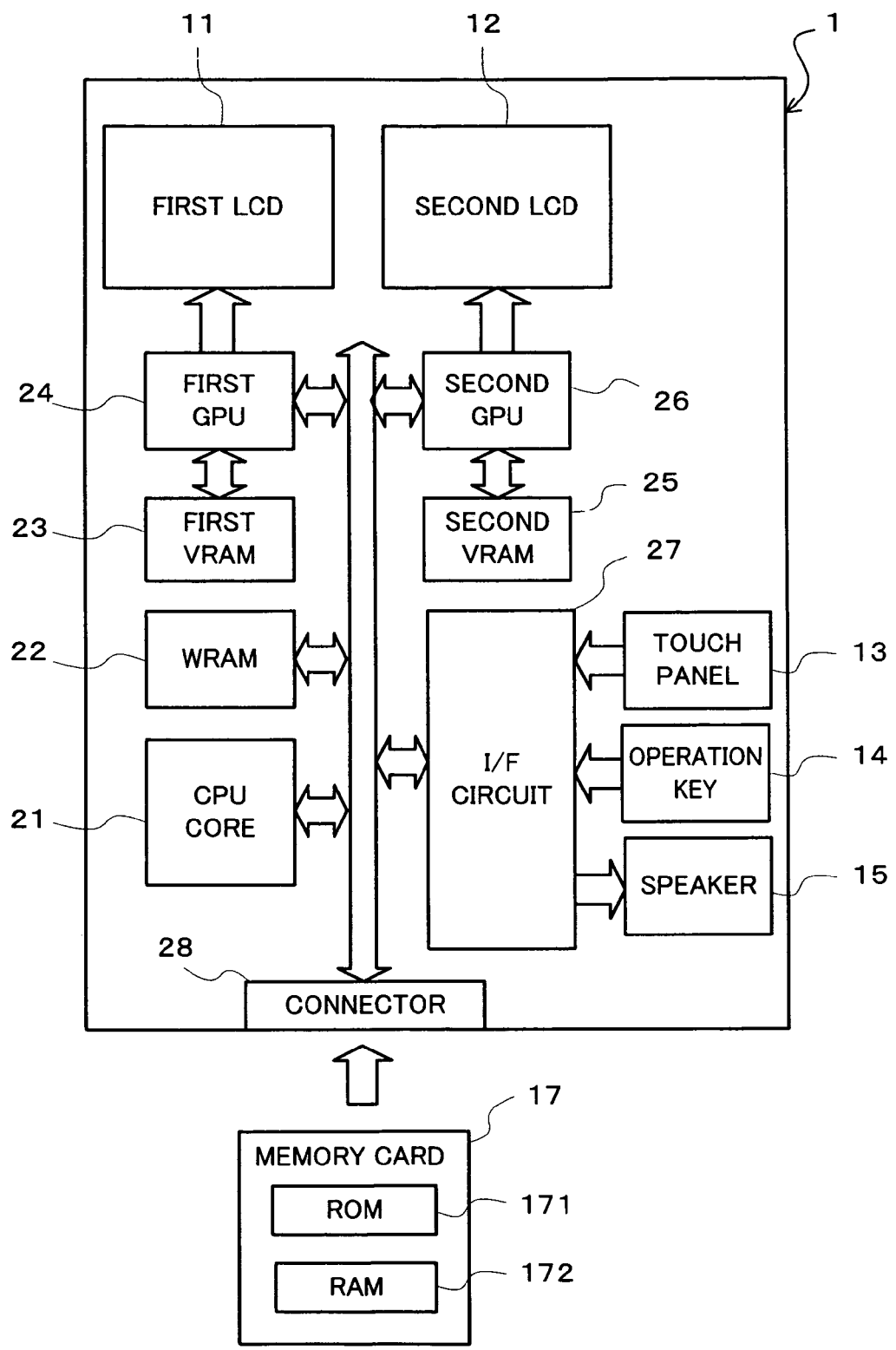
FIG. 2 is a block diagram showing an internal structure of the game apparatus 1.

Next, with reference to FIG. 2, an internal structure of the game apparatus 1 will be described. FIG. 2 is a block diagram showing the internal structure of the game apparatus 1.

In FIG. 2, the electronic circuit board accommodated in the lower housing 18a has a CPU core 21 acting as a computer mounted thereon. The CPU core 21 is connected to the connector 28 for connecting the CPU core 21 to the cartridge 17, an input/output interface (I/F) circuit 27, a first graphic processing unit (first GPU) 24, a second graphic processing unit (second GPU) 26, and a working RAM (WRAM) 22 via a predetermined bus.

To the connecter 28, the cartridge 17 is detachably connectable. As described above, the cartridge 17 is a storage medium for storing a game program. Specifically, the cartridge 17 has a ROM 171 for storing the game program and a RAM 172 for rewritably storing backup data. The game program stored in the ROM 171 in the cartridge 17 is loaded on the WRAM 22, and the game program loaded on the WRAM 22 is executed by the CPU core 21. Temporary data and data for generating an image, which can be obtained by the CPU core 21 through execution of the game program, are stored in the WRAM 22.

The I/F circuit 27 is connected to the touch panel 13, the operation switch section 14, and the speaker 15. The speaker 15 is located at a position inside the speaker holes described above.

The first GPU 24 is connected to a first video RAM (hereinafter, referred to the "VRAM") 23, and the second GPU 26 is connected to a second VRAM 25. In accordance with an instruction from the CPU core 21, the first GPU 24 generates a first game image based on data for generating an image stored in the WRAM 22, and draws the generated first game image in the first VRAM 23. In accordance with an instruction from the CPU core 21, the second GPU 26 generates a second game image based on data for generating an image stored in the WRAM 22, and draws the generated second game image in the second VRAM 25.

The first VRAM 23 is connected to the first LCD 11, and the second VRAM 25 is connected to the second LCD 12. In accordance with an instruction from the CPU core 21, the first GPU 24 outputs the first game image drawn in the first VRAM 23 to the first LCD 11. The first LCD 11 displays the first game image which is output from the first GPU 24. In accordance with an instruction from the CPU core 21, the second GPU 26 outputs the second game image drawn in the second VRAM 25 to the second LCD 12. The second LCD 12 displays the second game image which is output from the second GPU 26.

Hereinafter, game processing executed by the game apparatus 1 in accordance with the image processing program stored in the cartridge 17 will be described. In this embodiment, the image processing program according to the present invention will be executed by the game apparatus 1 as a game program. In this embodiment, only the first LCD 11, the display screen of which is covered with the touch panel 13, is used as the display device. Accordingly, the game apparatus 1 may not include the second LCD 12.

Now, the image processing executed in accordance with the image processing program according to the exemplary embodiment presented herein will be described. This image processing displays how a shape model constructed in a virtual area (two-dimensional or three-dimensional) is deformed like an elastic body. The shape model may be anything which can be displayed on a screen as an image during a game. For example, the shape model may represent a game character appearing during the game, or a game title displayed in an opening screen of the game. In this embodiment, a two-dimensional shape model located in a two-dimensional virtual plane will be deformed.

First, with reference to FIG. 3A through FIG. 3D, how a shape model is deformed will be described. FIG. 3A through FIG. 3D each show an exemplary shape model displayed on the screen of the first LCD 11. The shape model includes a plurality of apexes. In FIG. 3A through FIG. 3D, a shape model 31 displayed on a screen 32 of the first LCD 11 is a bent line including four apexes. In this embodiment, the shape model 31 is created by an input by the player as described in detail later. All the apexes of the shape model 31 are defined in association with at least one other apex of the shape model 31. A virtual spring is set between the associated apexes (see FIG. 4 and FIG. 7). A virtual spring is a spring virtually set between the apexes so as to generate a virtual force, the magnitude of which changes in accordance with the distance between the apexes. In actual processing, a virtual spring is set as a spring function, the input of which is a difference between a reference distance predetermined based on the shape of the shape model (the distance between the apexes where the shape model is in a reference state) and the inter-apex distance (the difference corresponds to the extension and shrinkage amount of the spring) and the output of which is a virtual force acting on the apexes (the force corresponds to a force generated by the extension and shrinkage of the virtual spring). This virtual spring enables the shape model to be deformed like an elastic model. The reason is as follows: since the apexes of the shape model are connected by a virtual spring, the distance between the apexes is variable owing to the elasticity of the virtual spring; this enables the shape model to be deformed. In the case of the shape model 31 shown in FIG. 3A through FIG. 3D, each two apexes connected by a line segment are associated with each other.

Figure 3A:
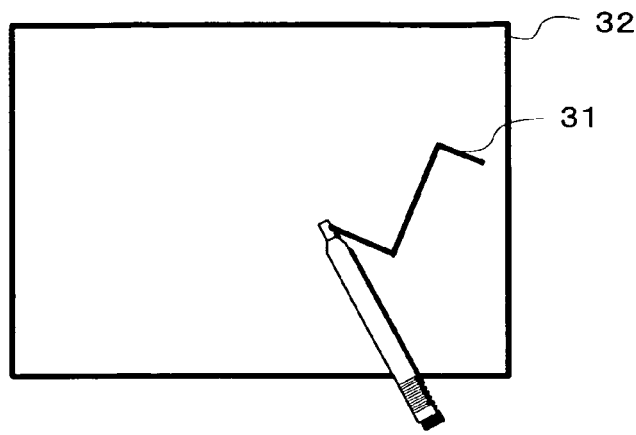
FIG. 3A, FIG. 3B, FIG. 3C and FIG. 3D each show an exemplary shape model displayed on a screen of a first LCD 11.

FIG. 3A shows a state before the shape model 31 is deformed. In this embodiment, a state where the shape model 31 is not deformed as in FIG. 3A is referred to as a "reference state". In this embodiment, the shape model 31 is deformed by an operation performed by the player. Specifically, the player can deform the shape model 31 by designating any apex of the shape model 31 and performing an operation of moving the designated apex. The apex is designated by designating a position in the vicinity of the desired apex using a stylus or the like. The designated apex can be moved by a drug operation performed by the player (an operation of moving the stylus on the touch panel while keeping the stylus contacted on the touch panel). In the following description, the leftmost apex in FIG. 3A is designated by the operation by the player. In the following description, an apex designated by the player is referred to as a "control point". A control point is a point acting as a reference for the deformation of the shape model.

Figure 3B:
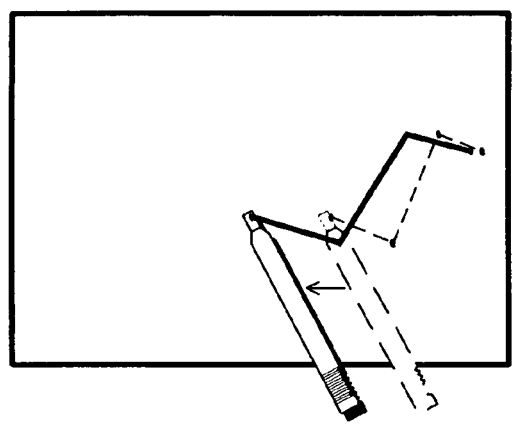
Figure 3C:
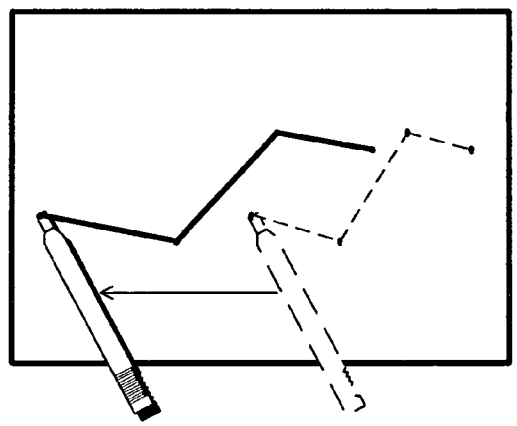

FIG. 3B and FIG. 3C show a state where the shape model 31 is deformed. In each of FIG. 3B through FIG. 3D, the dashed line indicates the shape model 31 and the stylus in the immediately previous state (the state in the immediately previous figure). When the player moves the apex as the control point leftward, as in FIG. 3B, the apexes other than the control point are each moved by a virtual force received by a respective virtual spring. In the state shown in FIG. 3B immediately after the movement of the control point is started, the shape model 31 is deformed so as to extend in the direction in which the apex as the control point has been moved.

Figure 3D:
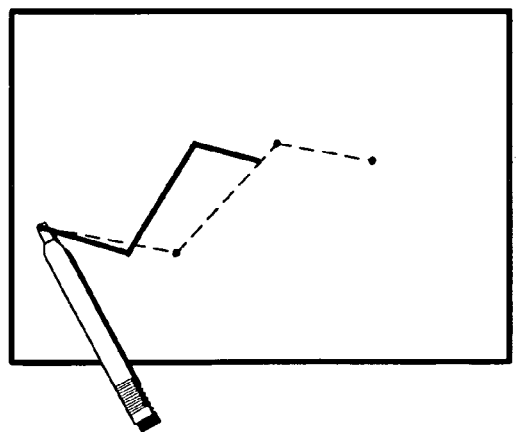

FIG. 3C shows a state where the control point is further moved leftward a certain time period after the state shown in FIG. 3B. In this state also, the apexes other than the control point are moved leftward like in FIG. 3B. In FIG. 3C, the shape model 31 is deformed so as to further extend leftward than in the state in FIG. 3B. FIG. 3D shows a state after the movement of the control point is stopped. When the movement of the apex as the control point is stopped as shown in FIG. 3D, the shape model 31 which has been deformed so as to extend starts to deform so as to shrink. After this, the shape model 31 returns to the original shape thereof and stops still.

The game apparatus 1 in this embodiment represents the deformation of the shape model 31 as shown in FIG. 3A through FIG. 3D.

Figure 4:
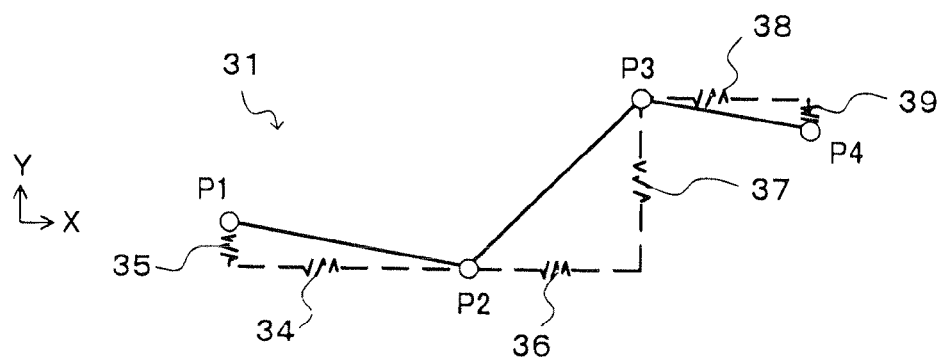
FIG. 4 shows virtual springs set between apexes of the shape model associated with each other.

Next, with reference to FIG. 4, virtual springs which are set for the shape model in this embodiment will be described. FIG. 4 shows virtual springs which are set between the apexes associated with each other. As shown in FIG. 4, virtual springs 34 through 39 are set between the apexes of the shape model 31 associated with each other. Notably, between each pair of apexes associated with each other, two virtual springs are set in the directions of coordinate axes of a rectangular coordinate system in which the shape model 31 is located (referred to as an "x axis" and a "y axis"). One virtual spring is set in an x axis direction (x direction virtual spring), and the other virtual spring is set in a y axis direction (y direction virtual spring). In FIG. 4, the x direction virtual axis 34 is set between apexes P1 and P2, the x direction virtual axis 36 is set between apexes P2 and P3, and the x direction virtual axis 38 is set between apexes P3 and P4. The y direction virtual axis 35 is set between the apexes P1 and P2, the y direction virtual axis 37 is set between apexes P2 and P3, and the y direction virtual axis 39 is set between the apexes P3 and P4.

An x direction virtual spring is a virtual spring generating a virtual force in accordance with the distance in the x axis direction between two apexes interposing the x direction virtual spring. The direction of the force generated by the x direction virtual spring is the x axis direction. A y direction virtual spring is a virtual spring generating a virtual force in accordance with the distance in the y axis direction between two apexes interposing the y direction virtual spring. The direction of the force generated by the y direction virtual spring is the y axis direction. An x direction virtual spring and a y direction virtual spring are independent from each other. Namely, a virtual force generated by an x direction virtual spring is irrelevant to the distance in the y axis direction between two apexes interposing the x direction virtual spring, and a virtual force generated by a y direction virtual spring is irrelevant to the distance in the x axis direction between two apexes interposing the y direction virtual spring.

As shown in FIG. 4, in this embodiment, two virtual springs, which are in the directions of the coordinate axes of the rectangular coordinate system and independent from each other, are set between each pair of apexes. Therefore, the force of a virtual spring in the x axis direction can be calculated separately from the force of a virtual spring in the y axis direction. Since the distance on the two-dimensional plane does not need to be calculated in this embodiment, heavy square calculation does not need to be performed. This simplifies the calculation using the virtual springs and thus alleviates the processing load on the game apparatus 1.

In this embodiment, the extension of a virtual spring in the x axis direction is processed separately from the extension of a virtual spring in the y axis direction. For example, when the apex P1 of the shape model 31 shown in FIG. 3A through FIG. 3D is moved in a direction parallel to the x axis direction, the x direction virtual springs 34, 36 and 38 extend or shrink but the y direction virtual directions 35, 37 and 39 do not extend or shrink. As a result, the length of the shape model 31 in the x axis direction is extended or shortened, but the length of the shape model 31 in the y axis direction does not change. Therefore, in this embodiment, even when the shape model 31 is one line as shown in FIG. 3A through FIG. 3D, the shape model 31 can extend or shrink while keeping the original shape thereof to some extent (see FIG. 3A through FIG. 3D).

Figure 5:
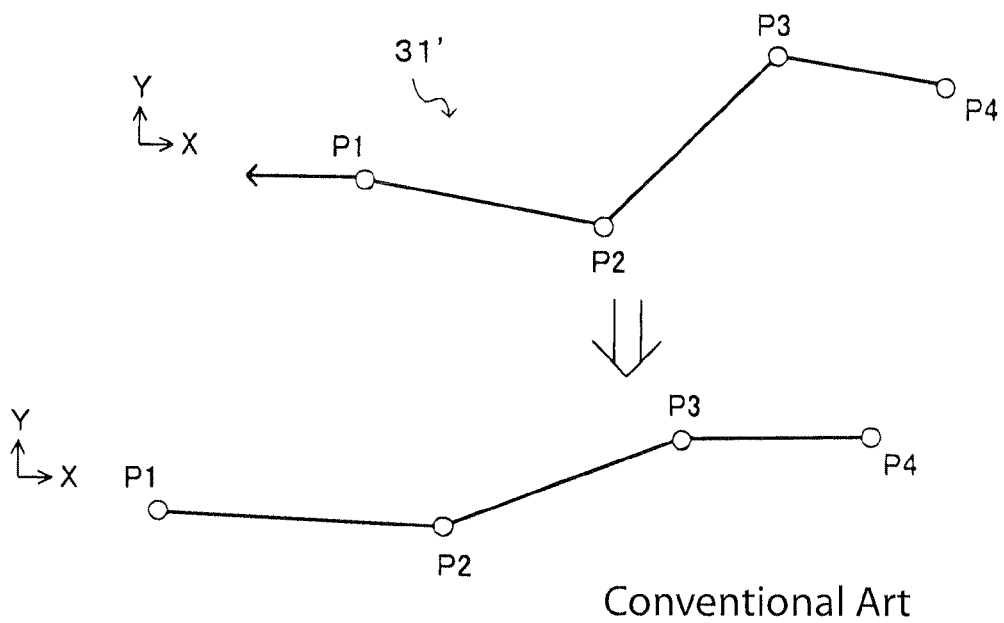
FIG. 5 shows how the shape model is deformed when an apex of the shape model is moved by a conventional method.

In a conventional method of setting a virtual spring for directly connecting apexes to each other, the shape model may not keep the original shape thereof. FIG. 5 shows how the shape model is deformed when the apexes are moved by such a conventional method. An apex P1 of a shape model 31' shown in FIG. 5 is moved in the x axis direction as in FIG. 3A. With the conventional method, apexes P2 through P4 are moved also in the y axis direction. As a result, the shape model 31' may be undesirably deformed to be crushed in the y axis direction, and the shape thereof is significantly changed from the original shape. In order to avoid this, another virtual spring is required to be set between the apexes P1 and P3 and between the apexes P2 and P4. By contrast, this embodiment, in which two independent virtual springs are set between each pair of apexes, can avoid the significant deformation as shown in FIG. 5.

The association of the apexes shown in FIG. 4 is performed fixedly to the shape model in advance. Accordingly, the virtual springs shown in FIG. 4 are fixedly preset for the shape model 31. Namely, the virtual springs shown in FIG. 4 are always set for the shape model 31, and setting of the virtual springs is not influenced by, for example, the state of the shape model 31. Hereinafter, a virtual spring which is set between each two apexes associated with each other fixedly in advance will be referred to as a "first virtual spring".

Figure 6:
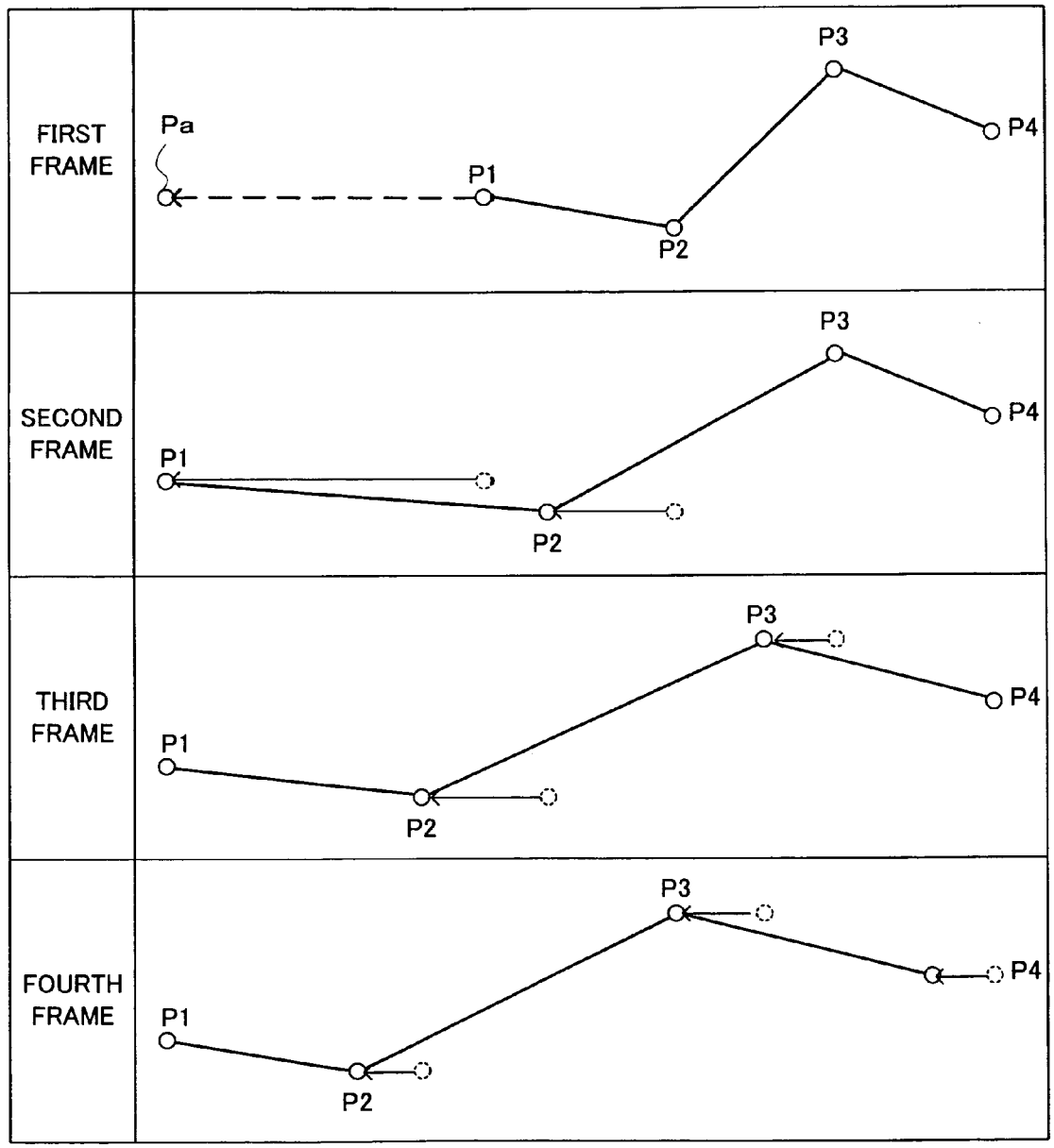
FIG. 6 shows how the shape model shown in FIG. 4 is deformed frame time by frame time.

Next, processing for deforming the shape model 31 shown in FIG. 4 using first virtual springs will be described. FIG. 6 shows how the shape model 31 is deformed frame time by frame time. In FIG. 6, the apex P1 of the shape model 31 is designated as the control point. FIG. 6 shows how the shape model 31 is deformed by moving the apex P1. A first frame in FIG. 6 is a frame immediately before the shape model 31 is deformed. Between the first frame and a second frame, the player designates the apex P1 as the control point and moves the apex P1 to a position Pa in a direction parallel to the x axis direction of the rectangular coordinate system (see the dashed arrow in FIG. 6).

When the control point is moved, the game apparatus 1 executes the following processing sequentially during the display of each frame: (1) determination of the position of the control point; (2) calculation of the force generated in each virtual spring; (3) calculation of the force received by each apex; and (4) determination of the position of each apex. By (1) determination of the position of the control point, the position of the control point is determined in accordance with the position which is input by the player. By (2) calculation of the force generated in each virtual spring, the force applied by each virtual spring to a corresponding apex is calculated based on the extension of the virtual spring (the difference between the length of the virtual spring at that point and the length of the virtual spring in the reference state). By (3) calculation of the force received by each apex, the force received by each apex from the corresponding virtual springs is calculated based on the force generated by each virtual spring calculated in the processing of (3). By (4) determination of the position of each apex, the new position of each apex is determined based on the force received by each apex calculated in the processing of (3). In the second frame and thereafter, the processing of (1) through (4) is executed in each frame.

In the processing of determining the position of each apex executed in the second frame, the game apparatus 1 first determines the position of the control point by detecting the position which is input by the player (the processing of (1)). In the example shown in FIG. 6, the player moves the apex P1 to the position Pa. Therefore, the position Pa is detected as the position input by the player, and the position of the control point is determined on the position Pa. Namely, the position of the apex P1 is determined on the position Pa.

Next, the game apparatus 1 determines the force generated in each virtual spring based on the position of each apex at that point (the processing of (2)). The "position of each apex at that point" is the position detected in the second frame regarding the control point, and is the position determined in the immediately previous frame regarding the other apexes. Namely, the newly detected position (position Pa) is used as the current position of the apex P1, whereas the position determined (displayed) in the first frame is used as the current position of each of the apexes P2 through P4. In the second frame, the apex P1 has been moved from the position in the first frame. Therefore, the virtual spring between the apexes P1 and P2 is processed as generating a virtual force. By contrast, the virtual springs between the apexes P2 and P3 and between the apexes P3 and P4 are processed as generating no virtual force.

The game apparatus 1 calculates the force received by each apex from a corresponding virtual spring (the processing of (3)), and determines the new position of each apex other than the control point based on the calculated force (the processing of (4)). In the second frame, the apex P2 is moved by the influence of the virtual spring between the apexes P1 and P2. Since no virtual force is applied to the virtual springs between the apexes P2 and P3 and between the apexes P3 and P4, the apexes P3 and P4 do not move.

In the processing of determining the position of each apex executed in a third frame, the game apparatus 1 executes substantially the same processing as that of the second frame. Between the second and the third frames, the player does not move the control point. As a result, the position of the control point (apex P1) is still the position Pa. The positions of the apexes P2 through P4 are each determined based on the positions thereof at that point (i.e., the positions in the second frame). In the second frame, the apexes P1 and P2 have been moved from the positions thereof in the first frame. Therefore, in the processing of determining the position of each apex executed in the third frame, the virtual spring between the apexes P1 and P2 and the virtual spring between the apexes P2 and P3 are processed as generating a virtual force. As a result, the apex P3 starts to move, and the apexes P2 and P3 are moved. By contrast, in the second frame, the apexes P3 and P4 do not move. Therefore, the virtual spring between the apexes P3 and P4 is processed as generating no virtual force in the third frame. As a result, the apex P4 does not move.

In the processing of determining the position of each apex executed in a fourth frame, the game apparatus 1 executes substantially the same processing as that of the second and third frames. In the third frame, the apex P3 has been moved from the position thereof in the first and second frames. Therefore, in the fourth frame, the virtual spring between the apex P3 and P4 is processed as generating a virtual force. As a result, the apex P4 starts to move.

It is appreciated from FIG. 6, with the shape model 31 for which the virtual springs are set as shown in FIG. 4, an apex starts to move in a later frame as the number of connections from the control point to the apex increases. The "number of connections" means the number of line segments connecting the control point and the apex; i.e., the number of line segments which need to be passed to reach the apex from the control point. Accordingly, even when the control point is moved, an apex having a large number of connections from the control point is not quickly influenced by the movement of the control point. Namely, even when the player operates to move the control point, a portion of the shape model 31 far from the control point is not quickly deformed or moved. Such poor compliancy of apexes having a large number of connections from the control point is more conspicuous in a more complicated shape model with a larger number of apexes.

Figure 7:
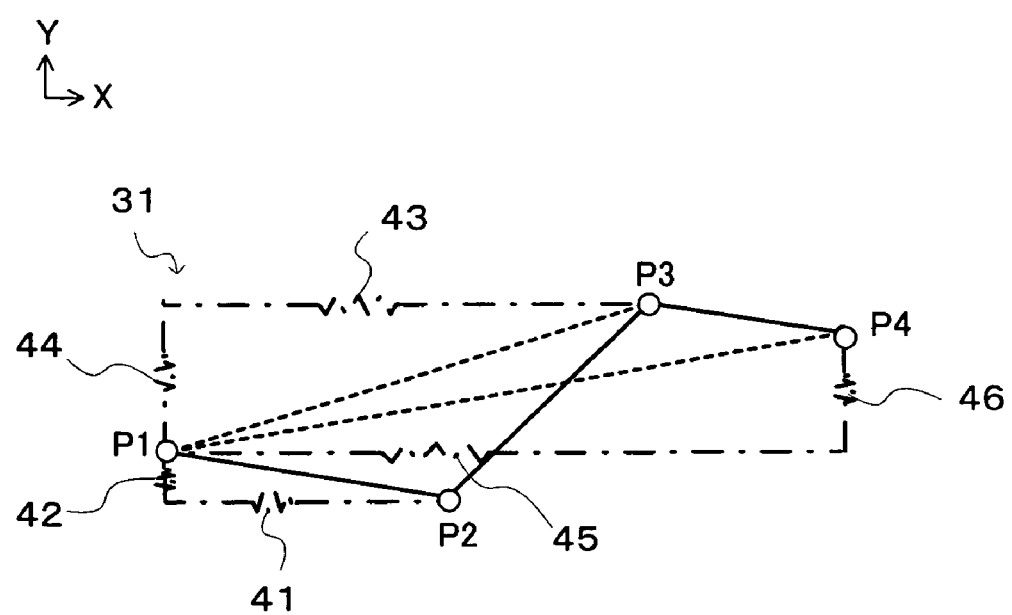
FIG. 7 shows second virtual springs set for the shape model.

In order to avoid this, in this embodiment, virtual springs which are variably set in accordance with the apex designated by the player (second virtual springs) are used in addition to the first virtual springs. FIG. 7 shows second virtual springs which are set for the shape model 31. In FIG. 7, the apex P1 is the control point. As shown in FIG. 7, second virtual springs 41 through 46 are set between the apex P1 as the control point and the other apexes (apexes P2 through P4).

Like the first virtual springs, two second virtual springs are set between each pair of apexes associated with each other in the directions of the coordinate axes of the rectangular coordinate system in which the shape model 31 is located (the x axis direction and the y axis direction). In FIG. 7, the second virtual springs 41, 43 and 45 are set in the x axis direction, and the second virtual springs 42, 44 and 46 are set in the y axis direction. Like the first virtual springs, two independent second virtual springs are set between each pair of apexes. As a result, the calculation processing using the virtual springs can be simplified and the processing load on the computer can be alleviated.

As shown in FIG. 7, the second virtual springs are set in addition to the first virtual springs in this embodiment. The second virtual springs are variably set; i.e., the second virtual springs are set between different apexes in accordance with the position of the apex as the control point. In this embodiment, the apexes of the shape model 31 are fixedly associated with each other in advance, and are also variably associated in accordance with the position of the control point.

Setting of the second virtual springs enables even an apex having a large number of connections from the control point to start moving in the frame in which the control point is moved (in the case of FIG. 6, the second frame). In other words, immediately after the control point starts to move, the movement of the control point influences the entire shape model 31. Thus, the compliancy of an apex having a large number of connections from the control point can be improved.

Figure 8:
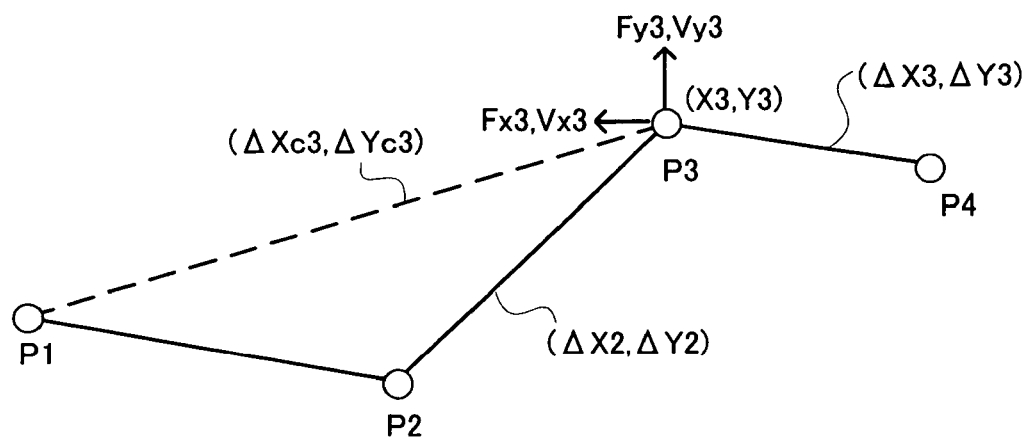
FIG. 8 shows variables used in the processing executed by the game apparatus 1.

Hereinafter, the processing executed in accordance with the image processing program according to this embodiment will be described in detail. First, variables and data used by the game apparatus 1 for executing the processing will be described. FIG. 8 illustrates variables used in the processing performed by the game apparatus 1. FIG. 8 uses a shape model including four apexes P1 through P4 for the illustration. In order to simplify the figure, only the variables regarding the apex P3 are shown. As shown in FIG. 8, the following variables are used in the processing. In the following, i is an integer of 1 through n (n is the number of apexes of the shape model).

The x coordinate value at the position of an apex P(i): $X(i)$

The y coordinate value at the position of the apex P(i): $Y(i)$

The distance between an apex P(i+1) and the apex P(i) in the x axis direction: $\Delta X(i)$ The distance between the apex P(i+1) and the apex P(i) in the y axis direction: $\Delta Y(i)$ The distance between the control point and the apex P(i) in the x axis direction: $\Delta Xc(i)$ The distance between the control point and the apex P(i) in the y axis direction: $\Delta Yc(i)$ The x coordinate component of the virtual force received by the apex P(i): $Fx(i)$ The y coordinate component of the virtual force received by the apex P(i): $Fy(i)$ The x coordinate component of the velocity of the apex P(i): Vx (i)

The y coordinate component of the velocity of the apex P(i): Vy (i)

Figure 9:
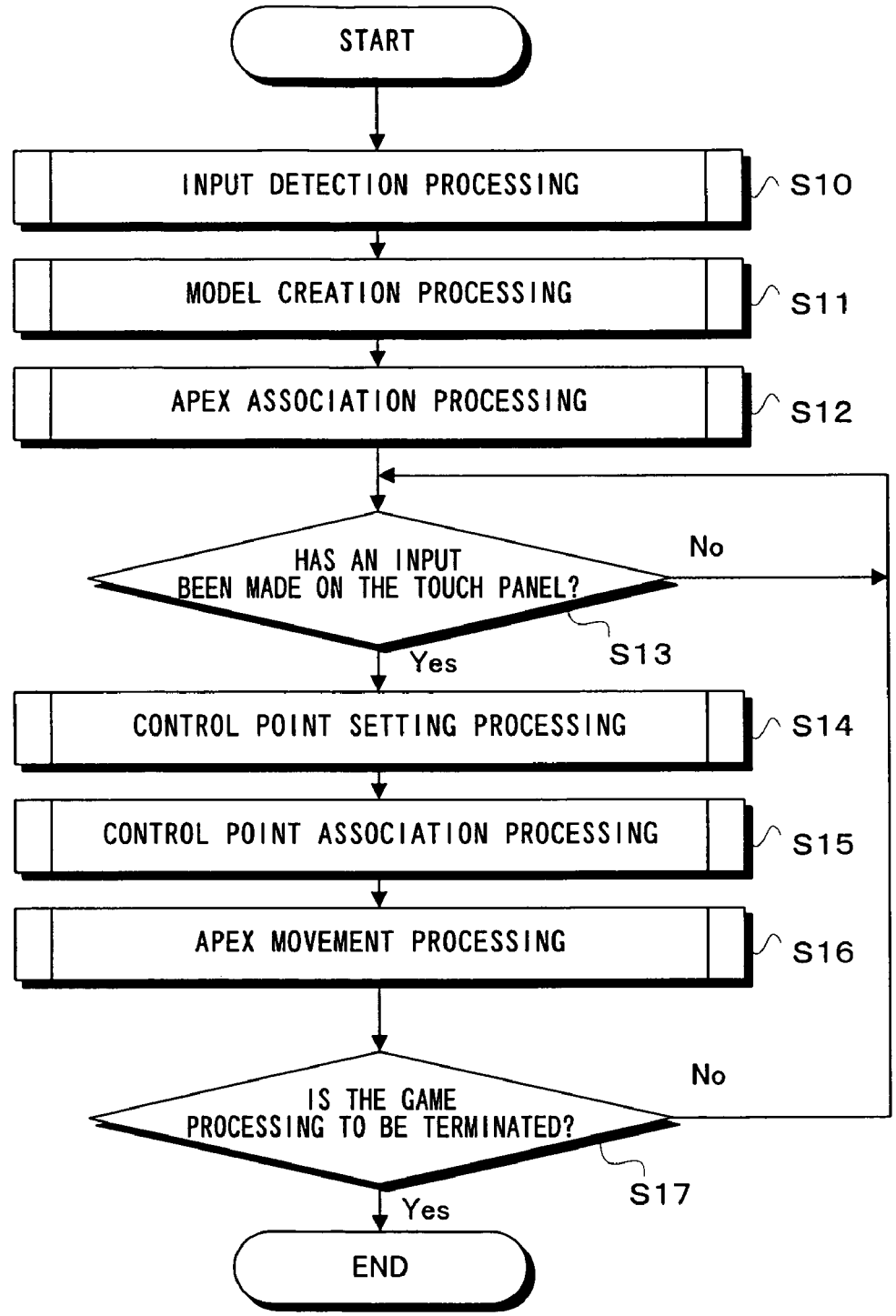
FIG. 9 is a flowchart illustrating a flow of the game processing executed by the game apparatus 1.

Hereinafter, a flow of the processing executed by the game apparatus 1 will be described. FIG. 9 is a flowchart illustrating a flow of the game processing executed by the game apparatus 1. When the power of the game apparatus 1 is turned on, the CPU core 21 of the game apparatus 1 executes a start program stored in a boot ROM (not shown), and thus the elements including the WRAM 22 are initialized. The program stored in the cartridge 17 is read to the WRAM 22, and the CPU core 21 starts executing the program. The flowchart shown in FIG. 9 is executed after such processing is completed.

With reference to FIG. 9, in step 10 (in the figures, "step" is simply labeled as "S") and step 11, a shape model as a target of deformation is created. As described above, in this embodiment, the shape model is created by an operation by the player. Specifically, a shape model having a shape in accordance with the locus drawn by the player on the touch panel 13 is created.

In step 10, input detection processing is executed. By the input detection processing, the input of a locus drawn by the player on the touch panel 13 is detected. The input detection processing will be described with respect to FIG. 10 through FIG. 13.

First, with reference to FIG. 10 through FIG. 12, an overview of the input detection processing will be described. FIG. 10 shows an exemplary locus drawn by the player on the touch panel 13. In this embodiment, the player inputs a wavy graphic 51 shown in FIG. 10 on the touch panel 13. FIG. 11 shows input points (input coordinate points) which are read by the game apparatus 1 from the graphic 51 shown in FIG. 10. When the graphic 51 is input to the game apparatus 1, input coordinate positions of input points Tp1 through Tp9 as shown in FIG. 11 are detected by the game apparatus 1. The input coordinate positions detected by the game apparatus 1 are stored in the WRAM 22 in an input coordinate list. FIG. 12 shows an exemplary input coordinate list. In this specification, a pair of an x coordinate and a y coordinate of a position in a rectangular coordinate system is referred to as a "coordinate position". The input coordinate list is data indicating the locus which is input on the touch panel 13 by the player. As shown in FIG. 12, the input coordinate list includes input coordinate positions indicating the points at which an input was made on the touch panel 13 by the player. The input coordinate positions are stored in the order of input, for example, as Tp1, Tp2, ... Tpm (m is an integer equal to or greater than 1). The input coordinate position of the i'th input, i.e., the input coordinate position of Tp(i) is represented as Xt(i) and Yt(i). By the input detection processing, the input coordinate list as shown in FIG. 12 is created based on the input coordinate positions obtained from the touch panel 13.

Figure 13:
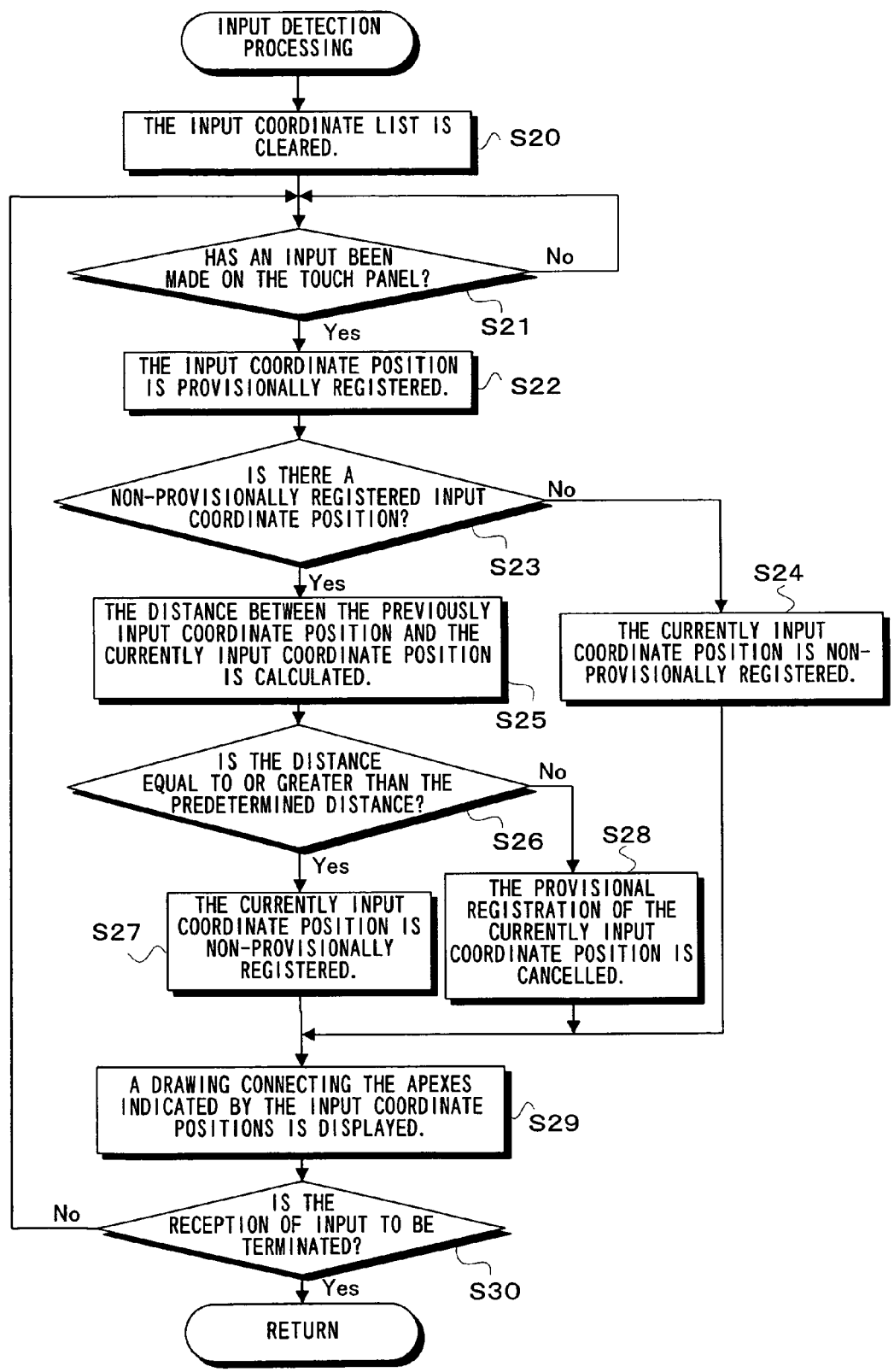
FIG. 13 is a flowchart illustrating a detailed flow of input detection processing shown in FIG. 9.

FIG. 13 is a flowchart illustrating a detailed flow of the input detection processing shown in FIG. 9. The input detection processing is executed as follows. In step 20, the contents of an existing input coordinate list are cleared (initialized). Next in step 21, it is determined whether or not an input has been made on the touch panel 13. In this embodiment, the processing for detecting an input coordinate position of an input made by the player on the touch panel 13 is executed every predetermined time period. Namely, the processing in step 21 is executed at an interval of a predetermined time period.

When it is determined in step 21 that no input has been made on the touch panel 13, the processing in step 21 is repeated. The processing in step 21 is repeated until an input is made on the touch panel 13. By contrast, when it is determined in step 21 that an input has been made on the touch panel 13, the processing advances to step 22. In step 22, the input coordinate position detected in step 21 is provisionally registered in the input coordinate list in the WRAM 22. The input coordinate position is added to the input coordinate positions already included in the input coordinate list, such that the input coordinate positions are arranged in the order of input. The expression "provisionally registered" is used here because the input coordinate position detected in step 21 may possibly be deleted from the input coordinate list during the input detection processing as described later.

Next in step 23, it is determined whether or not a non-provisionally registered input coordinate position is included in the input coordinate list. Specifically, it is determined whether or not there is an input coordinate position already included in the input coordinate list (non-provisionally registered input coordinate position) before the input coordinate position detected in step 21. When it is determined in step 23 that no non-provisionally registered input coordinate position is included in the input coordinate list, the processing advances to step 24. In step 24, the input coordinate position detected in step 21 is non-provisionally registered in the input coordinate list. The term "non-provisionally registered" means that the input coordinate position will not be deleted later in the input detection processing. After step 24, the processing advances to step 29.

By contrast, when it is determined in step 23 that a non-provisionally registered input coordinate position is included in the input coordinate list, the processing advances to step 25. In step 25, the distance between the provisionally registered input coordinate position (the input coordinate position detected in step 21) and the non-provisionally registered input coordinate position immediately previous thereto is calculated. Next in step 26, it is determined whether or not the distance calculated in step 25 is no less than a predetermined distance. When it is determined in step 26 that the distance calculated in step 25 is no less than the predetermined distance, the processing advances to step 27. In step 27, the input coordinate position detected in step 21 is non-provisionally registered in the input coordinate list. After step 27, the processing advances to step 29. By contrast, when it is determined in step 26 that the distance calculated in step 25 is less than the predetermined distance, the processing advances to step 28. In step 28, the input coordinate position detected in step 21 is deleted from the input coordinate list. After step 28, the processing advances to step 29.

As described above, in this embodiment, when the distance between the input coordinate position which was input on the touch panel during the immediately previous cycle of operation and the input coordinate position which was input on the touch panel during the current cycle of operation is smaller than a predetermined distance, the input coordinate position which was input during the current cycle of operation is deleted (step 28). In this way, unnecessary data can be deleted from the input coordinate list which indicates the locus of the input by the player. Thus, the data amount in the input coordinate list can be reduced.

In step 29, a drawing connecting the input coordinate positions included in the input coordinate list is displayed on the first LCD 11. The processing in step 29 enables the player to visually confirm the locus input on the touch panel 13 by himself/herself. Next in step 30, it is determined whether or not the reception of input is to be terminated. The determination in step 30 is performed based on, for example, whether or not the player has instructed to terminate the reception of input, or whether or not a predetermined period of time has passed since the first input coordinate position was detected. When it is determined in step 30 that the reception of input is not to be terminated, the processing returns to step 21. After this, the processing in steps 21 through 30 is repeated until it is determined in step 30 that the reception of input is to be terminated. By contrast, when it is determined in step 30 that the reception of input is not to be terminated, the CPU core 21 terminates the input detection processing shown in FIG. 13. By executing the input detection processing as described above, the input coordinate list is created.

Returning to FIG. 9, in step 11 after step 10, model creation processing is executed. By the model creation processing, a shape model having, as apexes, at least a part of the input coordinate positions included in the input coordinate list is created. A shape model may be created using all the input coordinate positions included in the input coordinate list created in step 10 as apexes. However, when the number of the input coordinate positions included in the input coordinate list (the number of apexes of the shape model) is large, the amount of data to be processed for deforming the shape model later is increased. In this embodiment, a part of the input coordinate positions included in the input coordinate list is thinned out, so that the shape of the locus indicated by the input coordinate list is simplified.

Figure 14:
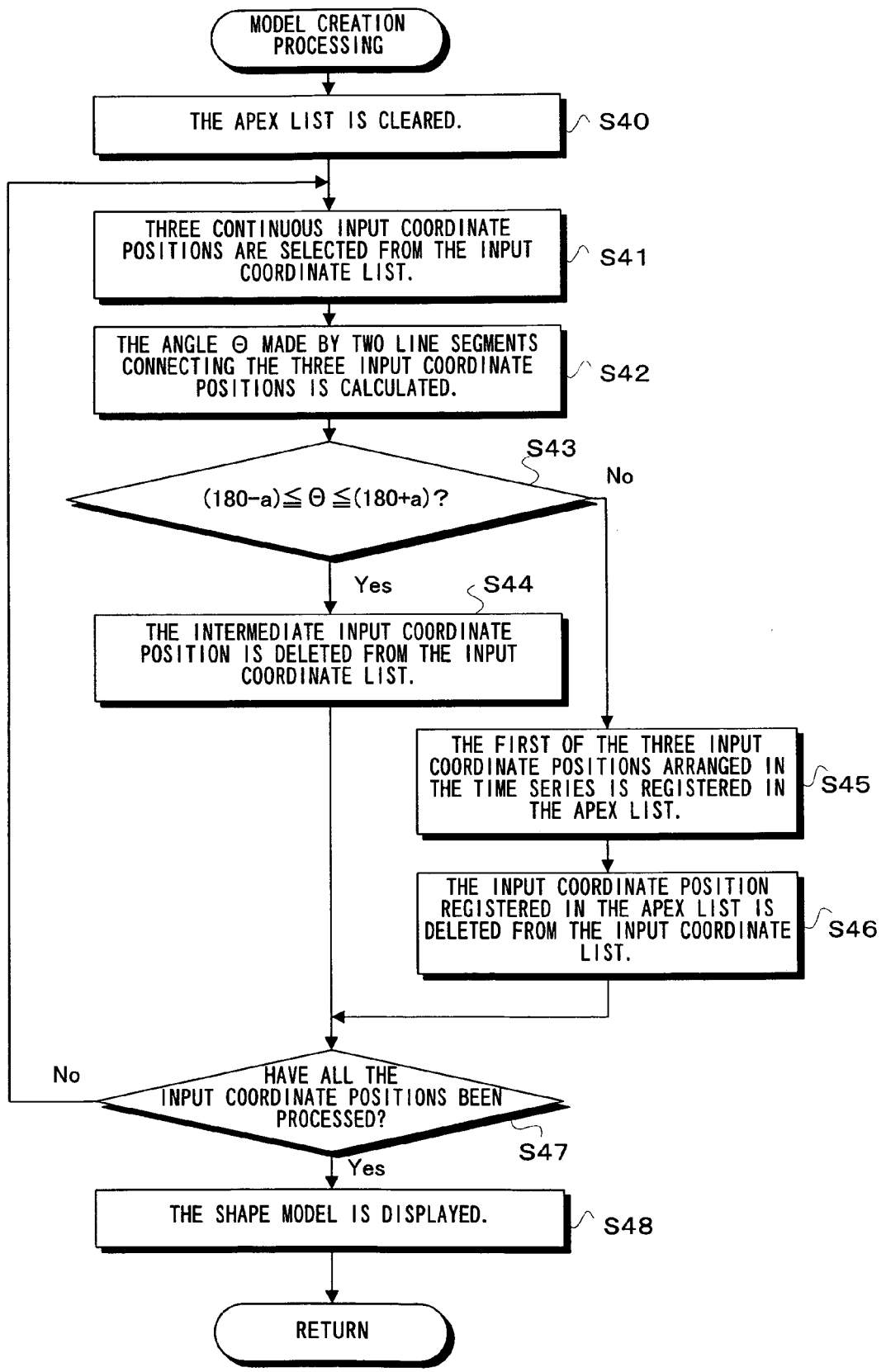
FIG. 14 is a flowchart illustrating a detailed flow of model creation processing shown in FIG. 9.
Figure 15:
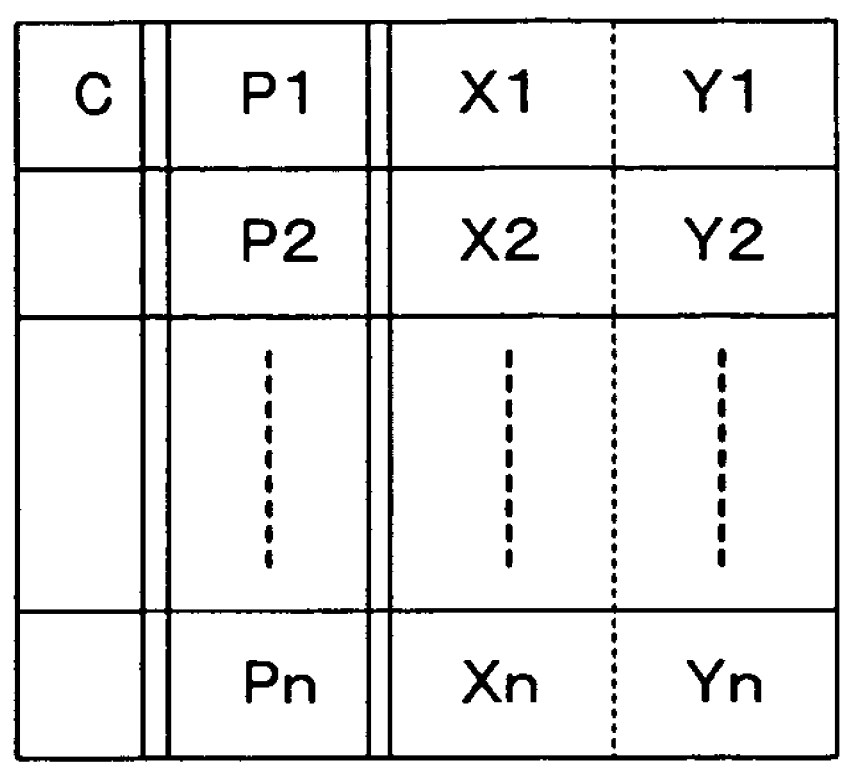

FIG. 14 is a flowchart illustrating a detailed flow of the model creation processing shown in FIG. 9. The model creation processing is executed as follows. In step 40, the contents of an apex list stored in the WRAM 22 are cleared. The apex list is data indicating the positions of the apexes of the shape model. Namely, the apex list shows the shape of the shape list. FIG. 15 shows an exemplary apex list. The apex list includes the coordinate position indicating the position of each apex. Specifically, for the apex P(i), an x coordinate X(i) and a y coordinate Y(i) are included. In FIG. 15, "C" in the leftmost column is a flag indicating a control point. The apex list shown in FIG. 15 indicates that the control point is the apex P1. In step 40, the contents of the apex list including the flag is entirely erased.

Next in step 41, three continuous input coordinate positions among the input coordinate positions included in the input coordinate list created in step 10 are selected. Here, the first through third input coordinate positions in the input coordinate list at this point are selected. Next in step 42, an angle Θ is calculated, which is made by two line segments connecting the three input coordinate positions selected in step 41 in the order of input. Next in step 43, it is determined whether or not the angle Θ calculated in step 42 fulfills expression (1).

$$(180-a) \leq \Theta \leq (180+a) \tag{1}$$

Here, "a" is a predetermined threshold value (a≧0). By the processing in step 43, it is determined whether or not the above-mentioned two line segments can be regarded as forming a substantially straight line. When the angle Θ fulfills expression (1), the two line segments can be regarded as forming a substantially straight line. By contrast, when the angle Θ does not fulfill expression (1), the two line segments cannot be regarded as forming a substantially straight line.

When it is determined in step 43 that the angle Θ calculated in step 42 fulfills expression (1), the processing advances to step 44. In step 44, the intermediate input coordinate position among the three input coordinate positions selected in step 41 is deleted from the input coordinate list. By the processing in step 44, the two line segments which are regarded as forming a substantially straight line are treated as one line segment. After step 44, the processing advances to step 47. By contrast, when it is determined in step 43 that the angle Θ calculated in step 42 does not fulfill expression (1), the processing advances to steps 45 and 46. In step 45, the first input coordinate position among the three input coordinate positions selected in step 41 is registered in the apex list stored in the WRAM 22. The first input coordinate position is added to the coordinate positions already included in the apex list, such that the input coordinate positions included in the apex list are arranged in the order of input by the player. In step 46, the input coordinate position registered in the apex list in step 45 is deleted from the input coordinate list. This is performed in order to prevent the same input coordinate position from being registered twice in the apex list. After step 46, the processing advances to step 47.

In step 47, the CPU 21 determines whether or not all the input coordinate positions included in the input coordinate list have been processed. Specifically, it is determined whether or not all the input coordinate positions included in the input coordinate list have been selected in step 41. When it is determined in step 47 that all the input coordinate positions have not been processed, the processing returns to step 41. The processing in steps 41 through 47 is repeated until all the input coordinate positions have been processed. By contrast, when it is determined in step 47 that all the input coordinate positions have been processed, the processing advances to step 48. In step 48, a shape model formed by the apexes registered in the apex list and the line segments connecting the apexes sequentially is displayed on the first LCD 11. After step 48, the CPU core 21 terminates the model creation processing shown in FIG. 14.

By executing the model creation processing as described above, points which should be apexes of the shape model are extracted from the input points indicated by the input coordinate positions included in the input coordinate list. For example, the shape model shown in FIG. 8 is created from extracting the apexes from the input points shown in FIG. 11. Namely, the apex list (FIG. 15) indicating the shape of the shape model is stored in the WRAM 22. In other embodiments, between steps 47 and 48, all the input coordinate positions included in the input coordinate list at that point may be registered in the apex list. In the processing shown in FIG. 14, the last input coordinate position and the second-to-the last input coordinate position in the input coordinate list are not registered in the apex list.

Returning to FIG. 9 again, in step 12 after step 11, apex association processing is executed. By the apex association processing, an apex of the shape model indicated by the apex list is associated with another apex of the shape model. In this embodiment, two apexes are associated by storing the two apexes to be associated with each other in an association list described later. The apex association processing is processing of creating a first association list (FIG. 17) including pairs of apexes between which the first virtual springs described above are to be set. In this embodiment, each apex is associated with an immediately previous apex and an immediately subsequent apex in the apex list.

Figure 16:
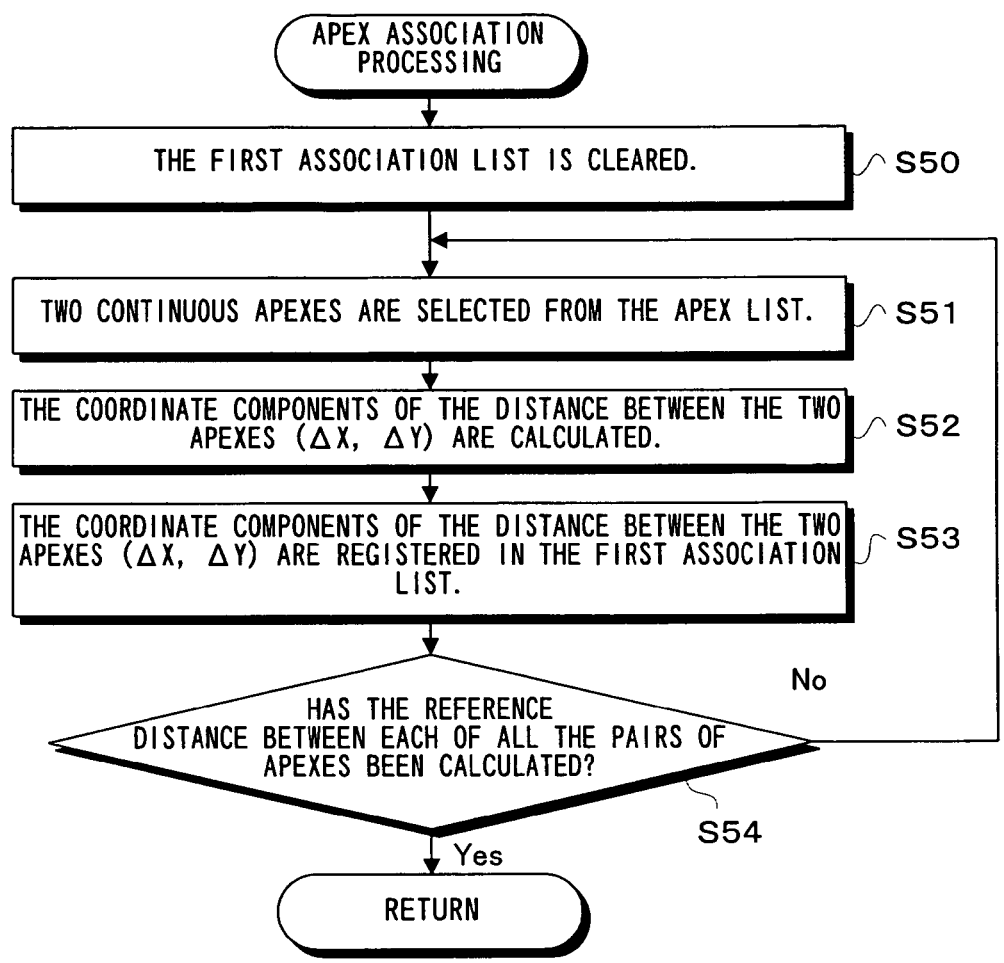
FIG. 16 is a flowchart illustrating a detailed flow of apex association processing shown in FIG. 9.
Figure 17:
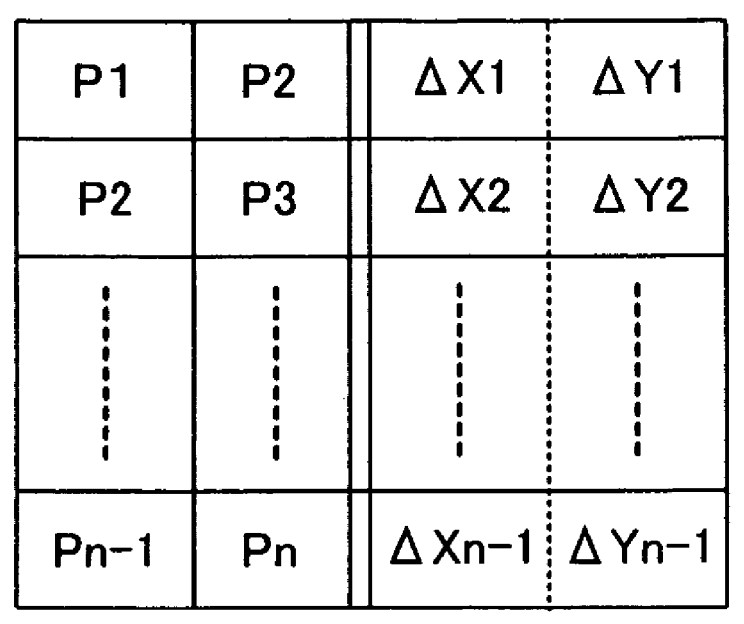

FIG. 16 is a flowchart illustrating a detailed flow of the apex association processing shown in FIG. 9. The apex association processing is executed as follows. In step 50, the contents of a first association list stored in the WRAM 22 are cleared. The first association list is data indicating pairs of apexes between which the first virtual springs are to be set and a reference distance between each pair of apexes. FIG. 17 shows an exemplary first association list. The first association list includes each pair of apexes between which the first virtual springs are to be set (two left columns in FIG. 17), a distance between each pair of apexes in the x axis direction (second-to-the-rightmost column in FIG. 17), and a distance between each pair of apexes in the y axis direction (the rightmost column in FIG. 17). The distance between the apex P(i+1) and the apex P(i) in the x axis direction is represented by ΔX(i), and the distance between the apex P(i+1) and the apex P(i) in the y axis direction is represented by ΔY(i).

In step 51, two continuous apexes are selected from the apex list (see FIG. 15) created in step 11. In step 51, two apexes between which the first virtual springs are to be set and which have not been selected in step 51 are selected. Next in step 52, coordinate components of the distance between the two apexes selected in step 51 are calculated. Specifically, where the two apexes selected in step 51 are the apex P(i) and the apex P(i+1), an x coordinate component ΔX(i) and a y coordinate component ΔY(i) of the distance between the apex P(i) and the apex P(i+1) are calculated by expression (2).

$$\Delta X(i) = X(i) - X(i+1)$$

$$\Delta Y(i) = Y(i) - Y(i+1) \qquad (2)$$

Here, X(i), X(i+1), Y(i) and Y(i+1) can be obtained by referring to the apex list. Each distance calculated in step 52 (ΔX(i), ΔY(i)) is a distance between the two apexes where the shape model is in the reference state, i.e., a reference distance. In step 53, the CPU core 21 registers the reference distances (ΔX(i), ΔY(i)) in the first association list (FIG. 17).

Next in step 54, it is determined whether or not the reference distance between each of all the pair of apexes between which the first virtual springs are to be set has been calculated. When there is at least one pair of apexes, the reference distance between which has not been calculated, the processing returns to step 51. The processing in steps 51 through 54 is repeated until the reference distance between each of all the pair of apexes has been calculated. By contrast, when the reference distance between each of all the pair of apexes has been calculated, the CPU core 21 terminates the apex association processing shown in FIG. 16. By executing the apex association processing as described above, the first association list (FIG. 17) is created.

Returning to FIG. 9 again, the shape model is created by the processing in steps 10 and 11, and the apexes of the shape model are associated by the processing in step 12. At this point, the preparation for deformation of the shape model is completed. In other embodiments, the processing in steps 10 and 11 may be omitted, and steps 13 through 17 described below may be executed using a shape model prepared in advance. In still other embodiments, the processing in steps 10 through 12 may be omitted, and steps 13 through 17 may be executed using a shape model, the apexes of which are associated in advance. By the processing in steps 13 through 17, how the shape model is deformed using the control point designated by the player is represented.

In step 13 after step 12, it is determined whether or not an input for designating a control point has been made on the tough panel 13. When it is determined in step 13 that no input has been made on the touch panel 13, the processing in step 13 is repeated. Namely, the processing in step 13 is repeated at an interval of a predetermined time period until an input is made on the touch panel 13. By contrast, when it is determined in step 13 that an input has been made on the touch panel 13, the processing advances to step 14. In step 14, control point setting processing is executed. By executing the control point setting processing as described above, a control point is set based on the designation performed by the player.

Figure 18:
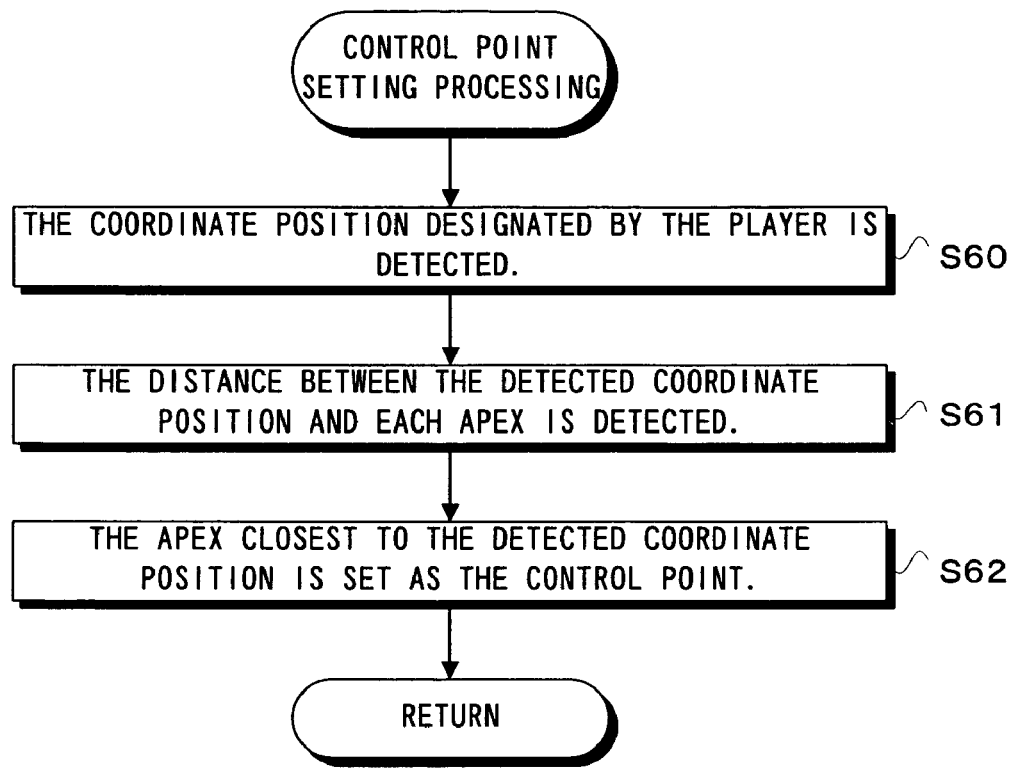
FIG. 18 is a flowchart illustrating a detailed flow of control point setting processing shown in FIG. 9.

FIG. 18 is a flowchart illustrating a detailed flow of the control point setting processing shown in FIG. 9. The control point setting processing is executed as follows. In step 60, the input coordinate position designated by the player is detected. Here, the input coordinate position which was input in step 13 during the current cycle of operation is detected. Next in step 61, the distance between the input coordinate position detected in step 60 and each of the apexes included in the apex list (FIG. 15) created in step 11 is calculated. Next in step 62, the apex having the shortest distance from the input coordinate position as a result of the calculation in step 61 is set as the control point. Specifically, the flag ("C" in FIG. 15) is set for such an apex. Then, the CPU core 21 terminates the control setting processing shown in FIG. 18.

Returning to FIG. 9 again, in step 15 after step 14, control point association processing is executed. By executing the control point association processing as described above, the apex set as the control point is associated with all the apexes of the shape model. The control point association processing is processing of creating a second association list (FIG. 20) including pairs of apexes between which the second virtual springs described above are to be set.

Figure 19:
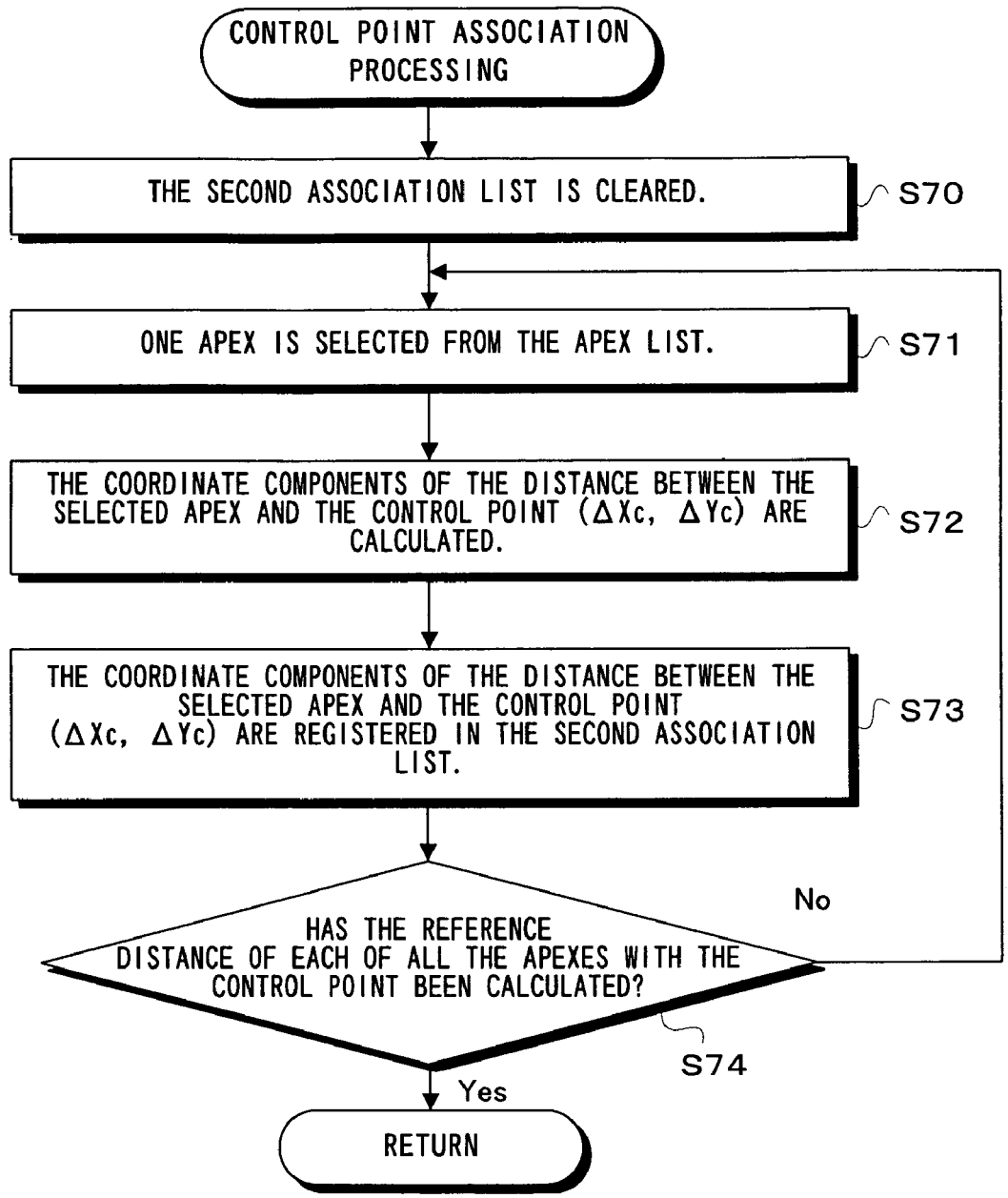
FIG. 19 is a flowchart illustrating a detailed flow of control point association processing shown in FIG. 9.

FIG. 19 is a flowchart illustrating a detailed flow of the control point association processing. The control point association processing is executed as follows. In step 70, the contents of an existing second association list are cleared. The second association list is data indicating pairs of apexes between which the second virtual springs are to be set and a reference distance between each pair of apexes. FIG. 20 shows an exemplary second association list. The second association list includes each pair of apexes between which the second virtual springs are to be set (two left columns in FIG. 20), a distance between each pair of apexes in the x axis direction (second-to-the-rightmost column in FIG. 20), and a distance between each pair of apexes in the y axis direction (the rightmost column in FIG. 20). The distance in the x axis direction between the control point (represented by letter "C") and the apex P(i) is represented by ΔXc(i), and the distance in the y axis direction between the control point C and the apex P(i) is represented by ΔYc(i). In this embodiment, the control point C and the apex identical thereto are also associated with each other, but such association may be omitted.

In step 71, one apex is selected from the apex list. In step 71, the first apex among the apexes included in the apex list which have not been selected in step 71 is selected. Next in step 72, coordinate components of the distance between the apex selected in step 71 and the control point C are calculated. Specifically, where the apex selected in step 71 is the apex P(i), an x coordinate component ΔXc(i) and a y coordinate component ΔYc(i) of the distance between the apex P(i) and the control point C are calculated by expression (3).

$$\Delta Xc(i) = Xc(i) - X(i)$$

$$\Delta Yc(i) = Yc(i) - Y(i) \qquad (3)$$

Here, Xc is the x coordinate value of the control point C, and Yc is the y coordinate value of the control point C. Accordingly, Xc, X(i), Yc and Y(i) can be obtained by referring to the apex list. Each distance calculated in step 72 (ΔXc(i), ΔYc(i)) is a distance between the apex P(i) and the control point C where the shape model is in the reference state, i.e., a reference distance. The reference distance between the control point and the apex P(i) will be referred to as a "reference distance with the control point". Next in step 73, the CPU core 21 registers the reference distance with the control point C (ΔXc(i), ΔYc(i)) in the second association list (FIG. 20).

Next in step 74, it is determined whether or not the reference distance of each of all the apexes included in the apex list with the control point has been calculated. When there is at least one apex, the reference distance of which with the control point has not been calculated, the processing returns to step 71. The processing in steps 71 through 74 is repeated until the reference distance of each of all the apexes with the control point has been calculated. By contrast, when the reference distance of each of all the apexes with the control point has been calculated, the CPU core 21 terminates the control point association processing shown in FIG. 19.

Returning to FIG. 9 again, in step 16 after step 15, apex movement processing is executed. By the apex movement processing, the position to which each apex of the shape model to be moved in accordance with the movement of the control point is determined.

Figure 21:
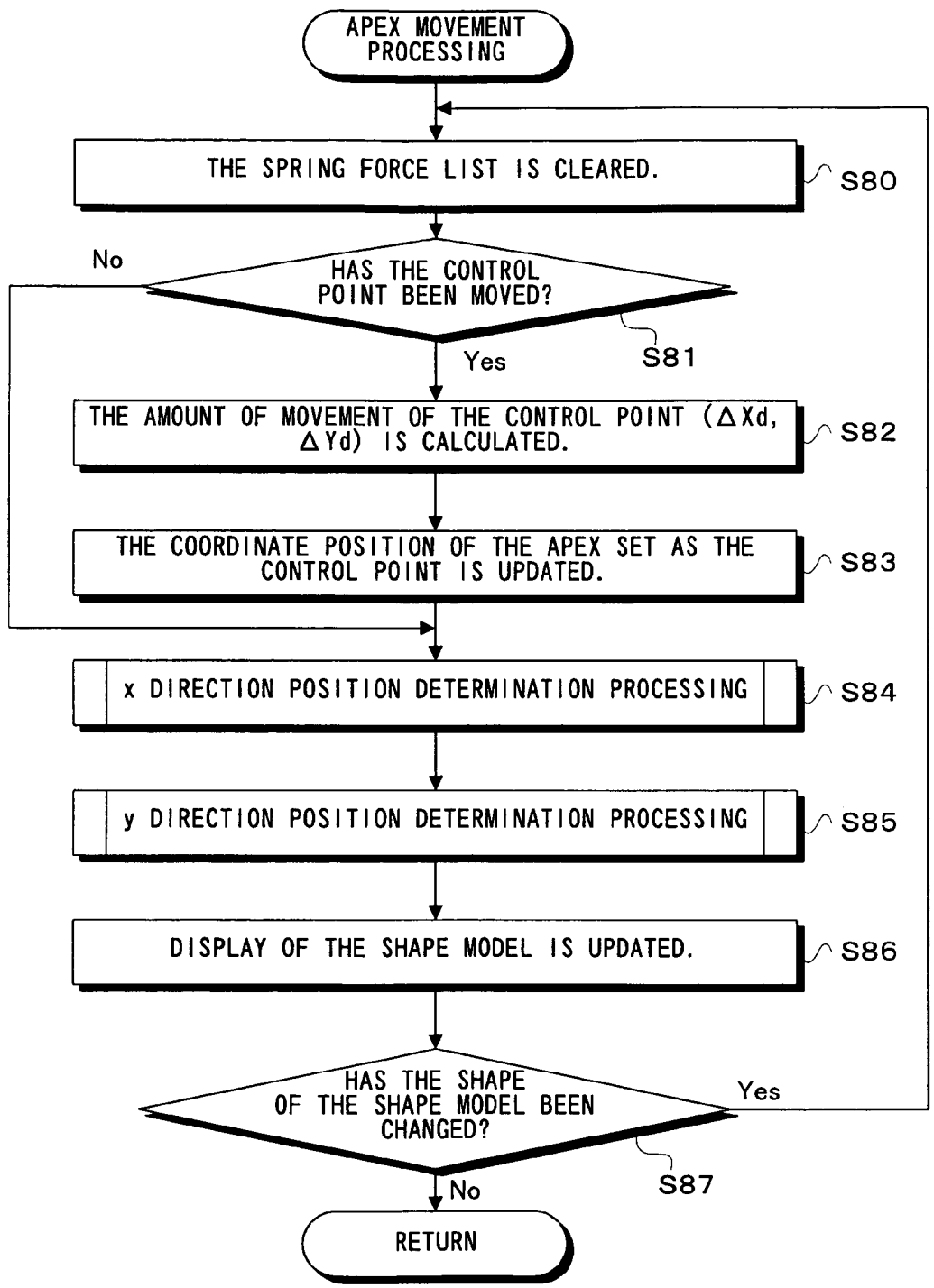
FIG. 21 is a flowchart illustrating a detailed flow of apex movement processing shown in FIG. 9.
Figure 22:
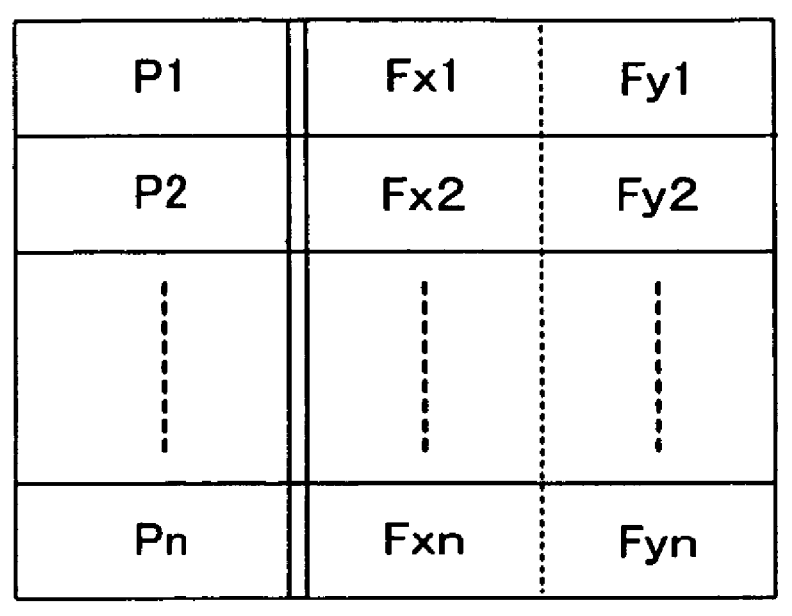

FIG. 21 is a flowchart illustrating a detailed flow of the apex movement processing. The apex movement processing is executed as follows. In step 80, the contents of a spring force list is cleared. FIG. 22 shows an exemplary spring force list. The spring force list includes coordinate components of a force received by each apex of the shape model from the respective virtual springs. In FIG. 22, an x coordinate component of the force received by the apex P(i) is represented by Fx(i), and a y coordinate component of the force received by the apex P(i) is represented by Fy(i).

In step 81, it is determined whether or not the control point has been moved. Specifically, the CPU core 21 obtains the coordinate position indicating the point at which an input have been made on the touch panel 13. Then, the CPU core 21 determines whether or not the obtained coordinate position is the same as the coordinate position obtained in step 81 during the immediately previous cycle of operation. The first time that the processing in step 81 is executed, the coordinate position detected in step 13 is used instead of the coordinate position obtained in step 81 during the immediately previous cycle of operation. When there is no input on the touch panel 13, it is determined that the control point has not been moved.

When it is determined in step 81 that the control point has not been moved, the processing in steps 82 and 83 is skipped and the processing in step 84 is executed. By contrast, when it is determined in step 81 that the control point has been moved, the processing in steps 82 and 83 is executed. In step 82, the amount of movement of the control point ($\Delta Xd$, $\Delta Yd$) is calculated. The amount of movement is calculated using the coordinate position obtained from the touch panel 13 in step 81 during the current cycle of operation and the coordinate position obtained in step 81 during the immediately previous cycle of operation. Specifically, where the coordinate position obtained from the touch panel 13 in step 81 during the current cycle of operation is (Xd1, Yd1) and the coordinate position obtained in step 81 during the immediately previous cycle of operation is (Xd2, Yd2), the amount of movement of the control point ($\Delta Xd$, $\Delta Yd$) is calculated by expression (4).

$$\Delta Xd = Xd1 - Xd2$$
$$\Delta Yd = Yd1 - Yd2 \tag{4}$$

Next in step 83, the coordinate position of the apex set as the control point is updated. Specifically, the coordinate position of such an apex in the apex list is updated.

As described above regarding step 83, in this embodiment, the position of the apex as the control point is determined by designation performed by the player, and is not influenced by any virtual spring. Therefore, the player can easily move the shape model by operating the position of the control point.

In step 84, x axis direction position determination processing is executed. By the x axis direction position determination processing, the position of each apex of the shape model in the x axis direction is determined. For this processing, x direction virtual springs are used. In the x axis direction position determination processing, a "first virtual spring in the x axis direction" will be referred to as an "x direction first virtual spring", and a "second virtual spring in the x axis direction" will be referred to as an "x direction second virtual spring".

Figure 23:
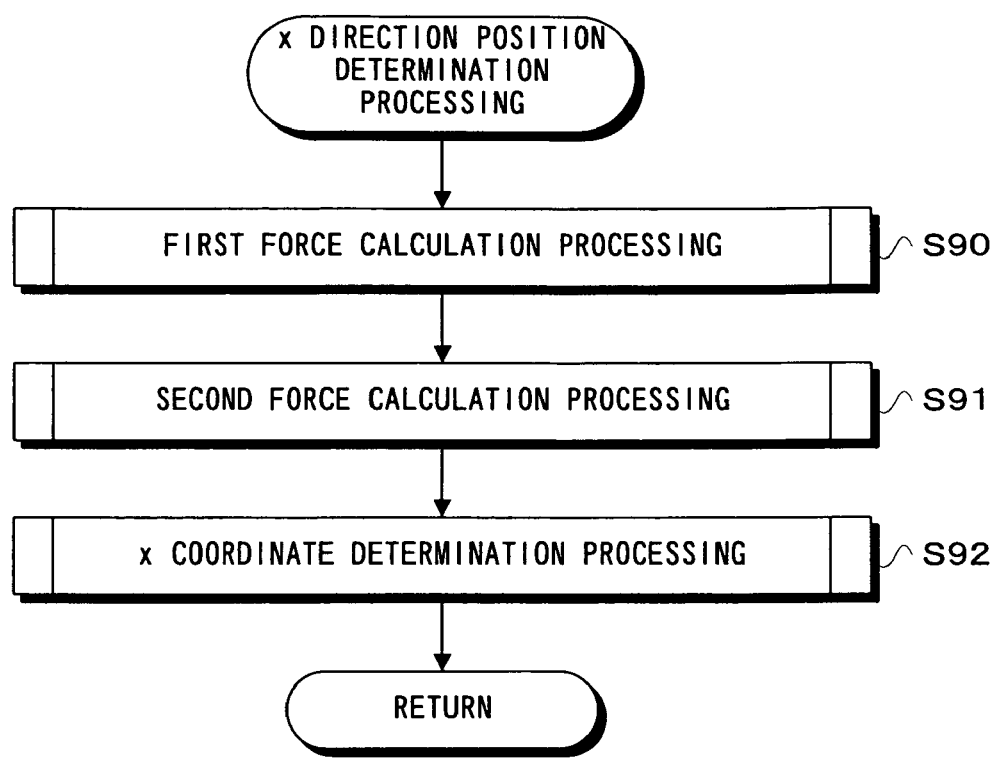
FIG. 23 is a flowchart illustrating a detailed flow of x direction position determination processing shown in FIG. 21.

FIG. 23 is a flowchart illustrating a detailed flow of the x direction position determination processing shown in FIG. 21. The x direction position determination processing is executed as follows. In step 90, first force calculation processing is executed. By the first force calculation processing, a force applied to each apex by an x direction first virtual spring which is set between the apexes is calculated.

Figure 24:
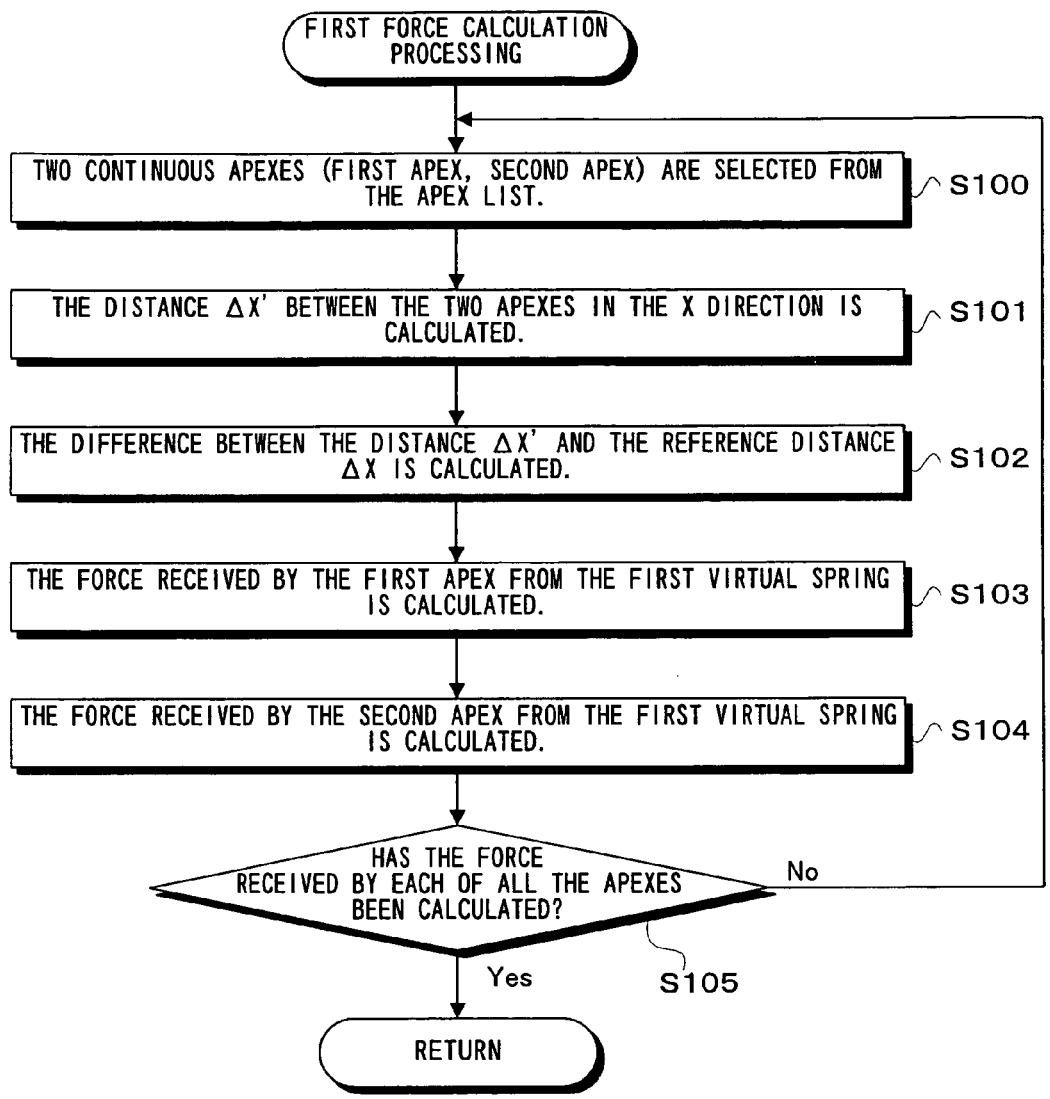
FIG. 24 is a flowchart illustrating a detailed flow of first force calculation processing shown in FIG. 23.

FIG. 24 is a flowchart illustrating a detailed flow of the first force calculation processing shown in FIG. 23. The first force calculation processing is executed as follows. In step 10, two continuous apexes are selected from the apex list. In step 100, two apexes between which an x direction first virtual spring is set and which have not been selected in step 100 are selected. Among the two selected apexes, the first apex in the apex list will be referred to as a "first apex", and the other apex will be referred to as a "second apex".

In step 101, the distance in the x axis direction between the two apexes selected in step 100 is calculated. Specifically, the distance $\Delta X(i)'$ in the x axis direction between the first apex P(i) and the second apex P(i+1) is calculated by expression (5).

$$\Delta X(i)' X(i) - X(i+1) \tag{5}$$

Here, X(i) and X(i+1) can be obtained by referring to the apex list (FIG. 15).

In step 102, the difference between (a) the distance in the x axis direction between the first apex P(i) and the second apex P(i+1) and (b) the reference distance is calculated. Specifically, the difference D(i) between the distance $\Delta X(i)'$ and the reference distance $\Delta X(i)$ is calculated by the expression: $D(i) = \Delta X(i)' - \Delta X(i)$. The reference distance $\Delta X(i)$ can be obtained by referring to the first association list.

In step 103, a force received by the first apex from the x direction first virtual spring which is set between the first apex P(i) and the second apex P(i+1) is calculated. The force to be calculated here is the sum of a "spring force" of the x direction first virtual spring (in proportion to the difference D(i)) and an attenuation force applied to the x direction first virtual spring (in proportion to the velocity Vx(i) of the apex). Accordingly, the force Fx(i) received by the first apex P(i) from the x direction first virtual spring set between the first apex P(i) and the second apex P(i+1) is calculated by expression (6).

$$Fx(i) = -kx \times D(i) - dx \times Vx(i) \tag{6}$$

Here, kx is the spring coefficient of the x direction first virtual spring, and the dx is the attenuation coefficient of the x direction first virtual spring. kx and dx are predetermined and are equal to or greater than zero. In this embodiment, kx and dx are each set to the same value for all the x direction first virtual springs. In other embodiments, kx and dx may be set to different values for different x direction first virtual springs. In this embodiment, the force received by the first apex from the x direction first virtual spring is calculated in consideration of the force of the x direction first virtual spring (the first term in the right side of expression (6)) as well as the attenuation force applied thereto (the second term in the right side of expression (6)). In other embodiments, the force may be calculated only based on the force of the x direction first virtual spring, with the attenuation force being ignored.

Figure 25:
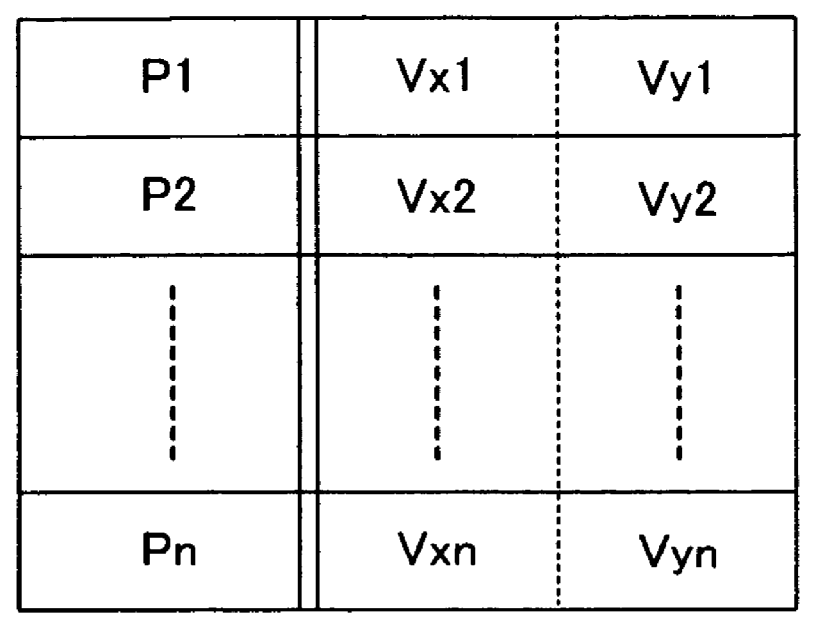

In expression (6), Vx(i) is the velocity of the first apex P(i). The velocity of each apex of the shape model is included in a velocity list stored in the WRAM 22. FIG. 25 shows an exemplary velocity list. The velocity list includes coordinate components of the velocity of each apex. In the velocity list, an x coordinate component of the velocity of the first apex P(i) is represented by Vx(i), and a y coordinate component thereof is represented by Vy(i).

Returning to FIG. 24, the force calculated in step 103 is included in the spring force list. More specifically, the force Fx(i) calculated in step 103 is included in the spring force list in association with the first apex P(i).

In step 104, the force received by the second apex P(i+1) by the x direction first virtual spring which is set between the first apex P(i) and the second apex P(i+1) is calculated. Specifically, the force Fx(i+1) received by the second apex P(i+1) from the x direction first virtual spring set between the first apex P(i) and the second apex P(i+1) is calculated by expression (7).

$$Fx(i+1) = -kx \times (\Delta X(i)' - \Delta X(i)) - dx \times Vx(i+1) \quad (7)$$

The force Fx(i+1) calculated in step 104 is added to the spring force Fx(i+1) already included in the spring force list, and the resultant sum is newly included in the spring force list as Fx(i+1). By the processing in steps 103 and 104, the sum of the forces received by each apex from all the x direction first virtual springs connected to the apex has been registered in the spring force list when the first force calculation processing is terminated.

In step 105, it is determined whether or not the force received by each of all the pairs of apexes between which an x direction first virtual spring is set has been calculated. When there is at least one pair of apexes, the force received by which has not been calculated, the processing in steps 100 through 105 is repeated until the force received by each of all the pairs of apexes is calculated. By contrast, when the force received by each of all the pairs of apexes has been calculated, the CPU core 21 terminates the first force calculation processing shown in FIG. 24.

Returning to FIG. 23, in step 91 after step 90, second force calculation processing is executed. By the second force calculation processing, a force applied to each apex by an x direction second virtual spring which is set between the control point and each apex is calculated.

Figure 26:
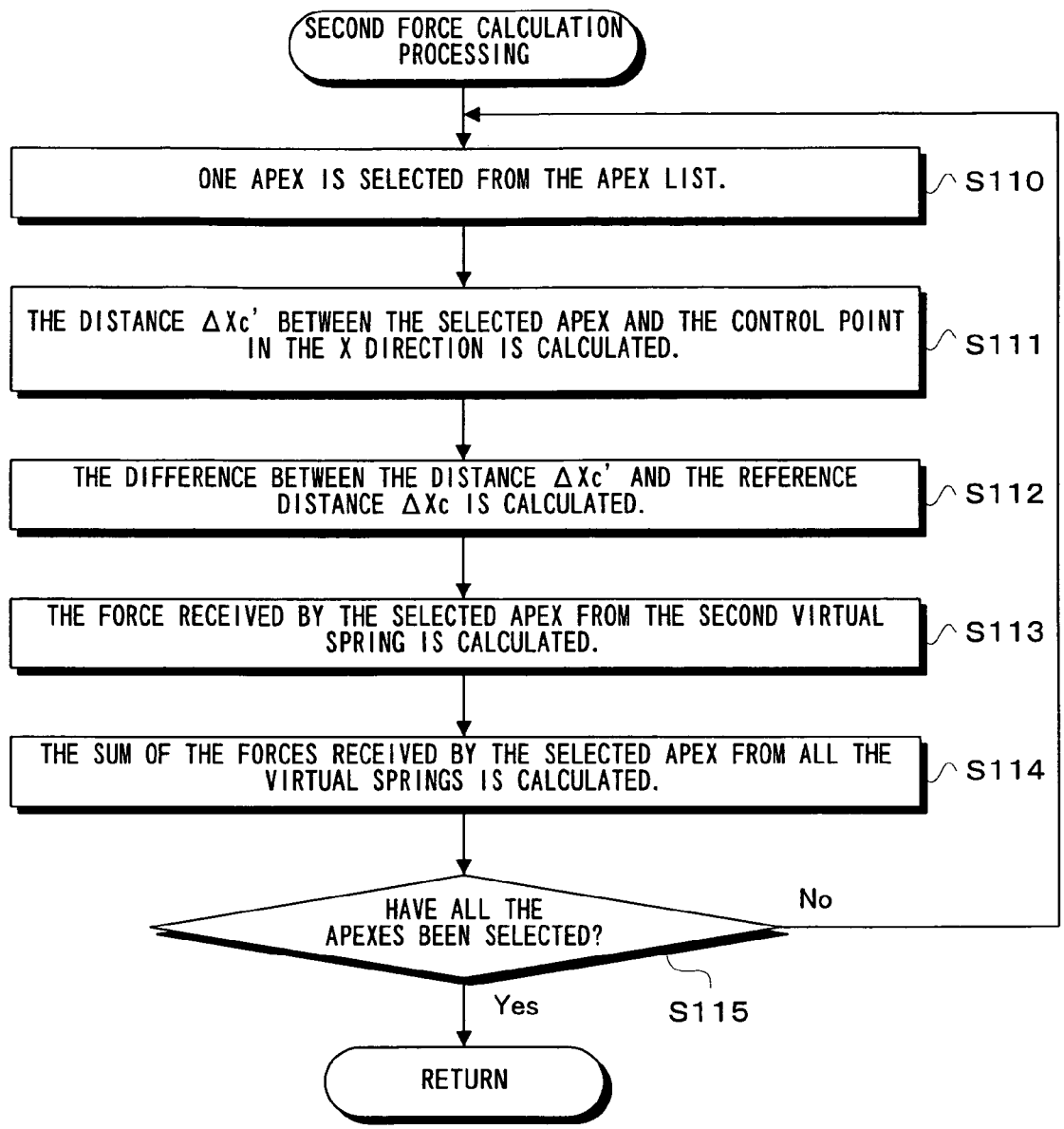
FIG. 26 is a flowchart illustrating a detailed flow of second force calculation processing shown in FIG. 23.

FIG. 26 is a flowchart illustrating a detailed flow of the second force calculation processing shown in FIG. 23. The second force calculation processing is executed as follows. In step 110, one apex is selected from the apex list. In step 110, the first apex among the apexes included in the apex list which have not been selected in step 110 is selected.

In step 111, the distance in the x axis direction between the control point and the apex selected in step 110 is calculated. Specifically, the distance $\Delta Xc(i)'$ in the x axis direction between the selected apex P(i) and the control point C is calculated by expression (8).

$$\Delta Xc(i)' = Xc(i) - Xc \quad (8)$$

Here, Xc(i) can be obtained by referring to the second association list. Xc, which is the x coordinate value of the apex as the control point C, can be obtained by referring to the apex list (FIG. 15).

In step 112, the difference between (a) the distance in the x axis direction between the apex P(i) and the control point C and (b) the reference distance is calculated. Specifically, the difference Dc(i) between the distance $\Delta Xc(i)'$ and the reference distance $\Delta Xc(i)$ is calculated by the expression: Dc(i) $= \Delta Xc(i)' - \Delta Xc(i)$. The reference distance $\Delta Xc(i)$ can be obtained by referring to the second association list.

In step 113, a force received by the apex P(i) selected in step 110 from the x direction second virtual spring which is set between the apex P(i) and the control point C is calculated. Like in the case of the x direction first virtual spring, the force to be calculated here is the sum of a "spring force" of the x direction second virtual spring and an attenuation force applied to the x direction second virtual spring. Accordingly, the force Fx(i) received by the apex P(i) from the x direction second virtual spring set between the apex P(i) and the control point C is calculated by expression (9).

$$Fx(i)' = -kx' \times Dc(i) - dx \times Vx(i) \quad (9)$$

Here, kx' is the spring coefficient of the x direction second virtual spring. kx' is predetermined and is equal to or greater than zero. In this embodiment, kx' and dx are each set to the same value for all the x direction second virtual springs. In other embodiments, kx' and dx may be set to different values for different x direction second virtual springs.

In step 114, the sum of the forces received by the apex P(i) selected in step 111 by all the x direction second virtual springs connected thereto is calculated. Specifically, the CPU core 21 adds the force Fx(i)' calculated in step 113 to the force already included in the spring force list (the force calculated in steps 103 or 104), and includes the resultant sum in the spring force list. As a result, the spring force list shows the sum of the forces received by the apex from the all the x direction first virtual springs and all the x direction second virtual springs connected thereto.

Next in step 115, it is determined whether or not all the apexes included in the apex list have been selected in step 110. When there is at least one apex which has not been selected, the processing in steps 110 through 115 is repeated until all the apexes have been selected. By contrast, when all the apexes have been calculated, the CPU core 21 terminates the second force calculation processing shown in FIG. 26.

Returning to FIG. 23 again, by the processing in steps 90 and 91, the sum of the forces received by each apex (in the x axis direction) is calculated and included in the spring force list. In step 92 after step 91, x coordinate determination processing is executed. By the x coordinate determination processing, the x coordinate of the position to which each apex of the shape model is to be moved is determined based on the force received by the apex from the virtual springs.

Figure 27:
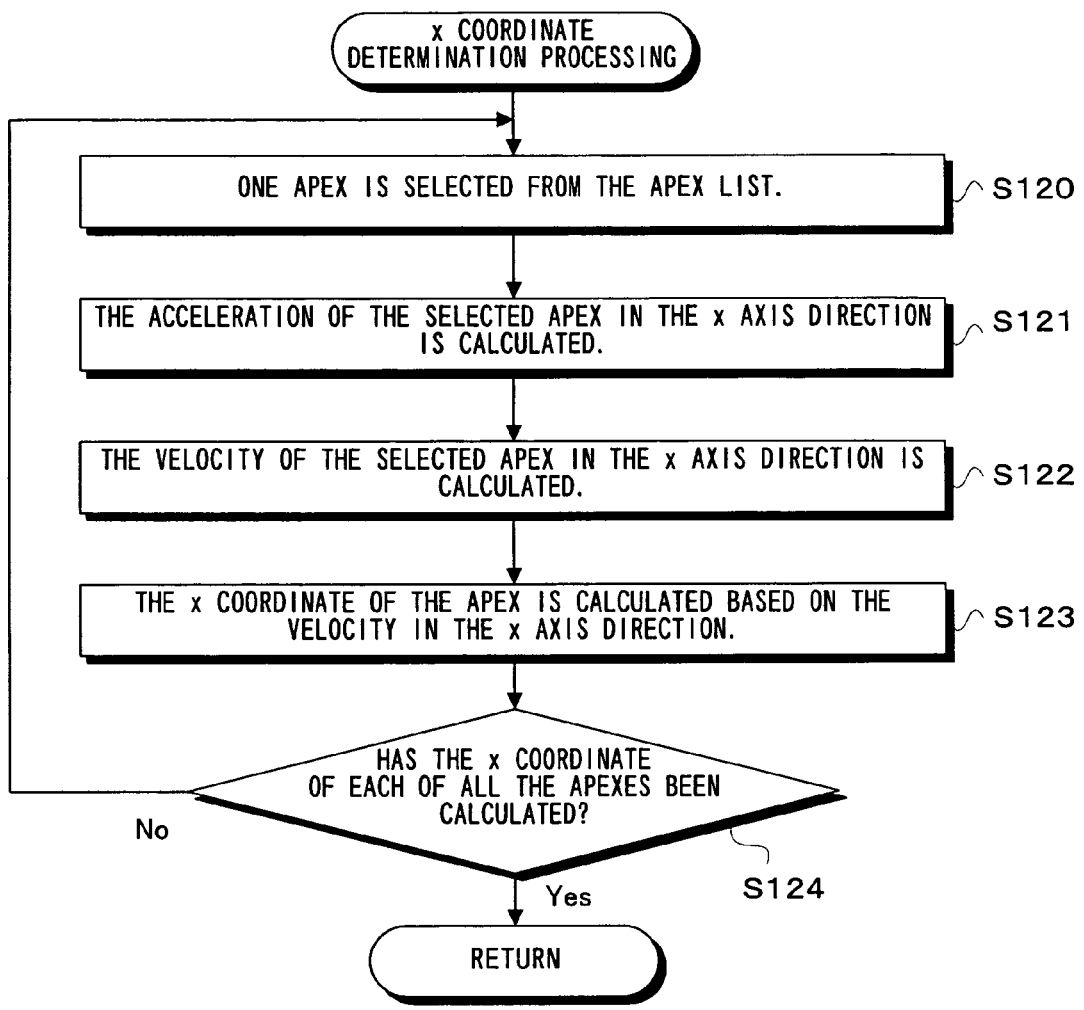
FIG. 27 is a flowchart illustrating a detailed flow of x coordinate determination processing shown in FIG. 23.

FIG. 27 is a flowchart illustrating a detailed flow of the x coordinate determination processing. The x coordinate determination processing is executed as follows. In step 120, one apex other than the control point is selected from the apex list. Specifically, the first apex among the apexes included in the apex list which have not been selected in step 120 is selected. The reason why the control point is not selected is that the position of the control point is already determined in step 83.

In step 121, the acceleration of the selected apex in the x axis direction is calculated based on the force received by the apex from the virtual springs. Specifically, the acceleration Ax(i) of the apex P(i) in the x axis direction is calculated by expression (10) based on the force Fx(i) included in the spring force list, where the mass of the apex P(i) is m(i)

$$Ax(i) = (Fx(i) - d \times Vx(i)')/m(i) \quad (10)$$

Here, d is the air resistance coefficient. Vx(i)' is the velocity of the apex P(i). Vx(i)' used in expression (10) is the value before the update performed in step 122 described below.

In step 122, the velocity of the selected apex in the x axis direction is calculated based on the acceleration of the apex calculated in step 121. Specifically, the velocity Vx(i) of the apex P(i) in the x axis direction is calculated by expression (11) based on the acceleration Ax(i).

$$Vx(i) = Vx(i)' + Ax(i) \times \Delta t \quad (11)$$

Here, Δt is the time interval by which the display image of the shape model is updated, i.e., the frame time. When the new velocity of the apex P(i) is calculated in step 122, the CPU core 21 updates the contents of the velocity list based on the newly calculated velocity.

In step 123, the x coordinate of the selected apex is calculated based on the velocity of the apex calculated in step 122. Specifically, the x coordinate X(i) of the apex P(i) is calculated by expression (12).

$$X(i)=X(i)'\times Vx(i)\times\Delta \tag{12}$$

Here, X(i)' is the x coordinate of the apex P(i) before the new x coordinate is calculated in step 123. X(i)' can be obtained by referring to the apex list (FIG. 15). When the new x coordinate of the apex P(i) is calculated in step 123, the CPU core 21 updates the apex list based on the newly calculated x coordinate. By the processing in steps 121 through 123, the x coordinate of the apex P(i) selected in step 120 is updated to the x coordinate of the new position thereof.

In step 124, it is determined whether or not the x coordinate of each of all the apexes included in the apex list has been calculated. When there is at least one apex, the x coordinate of which has not been calculated, the processing in step 120 through 124 is repeated until the x coordinate of all the apexes has been calculated. By contrast, when the x coordinate of all the apexes has been calculated, the CPU core 21 terminates the x coordinate determination processing shown in FIG. 27. At this point, the x direction position determination processing shown in FIG. 23 is terminated.

Returning to FIG. 21, by the x axis direction position determination processing in step 84, the new position (x coordinate) of each apex of the shape model in the x axis direction is determined. In step 85 after step 84, y axis direction position determination processing is executed. By the y axis direction position determination processing, the position of each apex of the shape model in the y axis direction is determined. This processing is substantially the same as the x axis direction position determination processing except that the position is in the y axis direction instead of the x axis direction, and detailed description thereof will be omitted.

In the x axis direction position determination processing (step 84) and the y axis direction position determination processing (step 85) described above, the virtual force generated by each virtual spring, the virtual force applied to each apex by a corresponding virtual spring, and the position to which each apex is to be moved by the virtual force are calculated independently for the x axis direction and the y axis direction, i.e., for each coordinate component. Therefore, the calculations regarding the virtual forces generated by the virtual springs are performed by adding parallel forces. As a result, as can be appreciated from steps 90 and 91, square calculations or square root calculations are not necessary in this embodiment. The position to which each apex is to be moved is also calculated using the virtual force of each coordinate component, with no need of square calculations or square root calculations.

By the processing in steps 84 and 85, the new position (the x coordinate and the y coordinate) of each apex of the shape model is determined. Accordingly, when the processing in step 85 is completed, the apex list has been updated to indicate the new position of each apex. In step 86, the display of the shape model is updated based on the updated apex list. Specifically, the position of each apex is updated to the position indicated by the apex list, and the resultant shape model is displayed on the first LCD 11.

Next in step 87, it is determined whether or not the shape model has been deformed. Namely, the CPU core 21 determines whether or not the shape model displayed in step 86 is the same as the pre-update shape model (i.e., the shape model one frame before). The determination in step 87 may be executed by comparing the new position of each apex and the position of each apex one frame before which has been stored, or may be executed based on whether or not the forces included in the spring force list are all zero. For a while after the movement of the control point is stopped, the shape model is deformed so as to return to the original shape (the shape in the reference state). When the shape model returns to the original shape, the shape model is stopped still (see FIG. 3C and FIG. 3D). By the processing in step 87, it is determined whether or not the shape model has returned to the original shape and stopped still.

When it is determined in step 87 that the shape model has been deformed, the processing returns to step 80. The processing in steps 80 through 87 is repeated until the shape model returns to the original shape and stops still. By contrast, when it is determined in step 87 that the shape model has the original shape thereof, the CPU core 21 terminates the apex movement processing shown in FIG. 21.

Returning to FIG. 9 again, in step 17 after step 16, it is determined whether or not the game processing is to be terminated. The determination in step 17 is executed based on, for example, whether or not the player instructed to terminate the game. When it is determined that the game processing is not to be terminated, the processing returns to step 13. The processing in steps 13 through 17 is repeated until it is determined that the game processing is to be terminated. By contrast, when it is determined that the game processing is to be terminated, the CPU core 21 terminates the processing shown in FIG. 9. Thus, the game processing is terminated.

As described above, in this embodiment, the calculation of the forces of the virtual springs in the x axis direction (step 84 in FIG. 21) and the calculation of the forces of the virtual springs in the y axis direction (step 85 in FIG. 21) can be executed separately. Accordingly, as can be appreciated from the description of the game processing, the square calculations or the square root calculations are not necessary. Therefore, the calculation processing using the virtual springs can be performed significantly more simply than those in the conventional methods. The image processing program in this embodiment is effective especially in mobile devices which do not have a very high data processing capability.

In this embodiment, the second virtual springs are set, so that the compliancy of apexes which are not directly connected to the control point can be improved. This enables the deformation of the shape model like an elastic body to be represented more naturally.

In this embodiment, the position of the control point is determined by the player. In other embodiments, the control point may be determined in accordance with an algorithm predetermined by the image processing program.

In this embodiment, even when the control point stops moving, as long as the shape model keeps deforming, the control point is set as it is and the position of the apex as the control point is not moved (the reason is that in the x coordinate determination processing shown in FIG. 27, the coordinate of the apex as the control point is not updated). In other embodiments, after the movement of the control point is completed, the control point may be reset; i.e., the position of the apex set as the control point may be moved by the force of a virtual spring. Specifically, when it is determined in step 81 in FIG. 21 that the control point has not been moved, the apex as the control point may be selected in step 120 in FIG. 27. The determination on whether or not the movement of the control point has been completed may be executed based on whether or not the position of the input on the touch panel 13 by the player has been kept unchanged from the position detected immediately previously, or whether or not there is no input on the touch panel 13 by the player.

Figure 28:
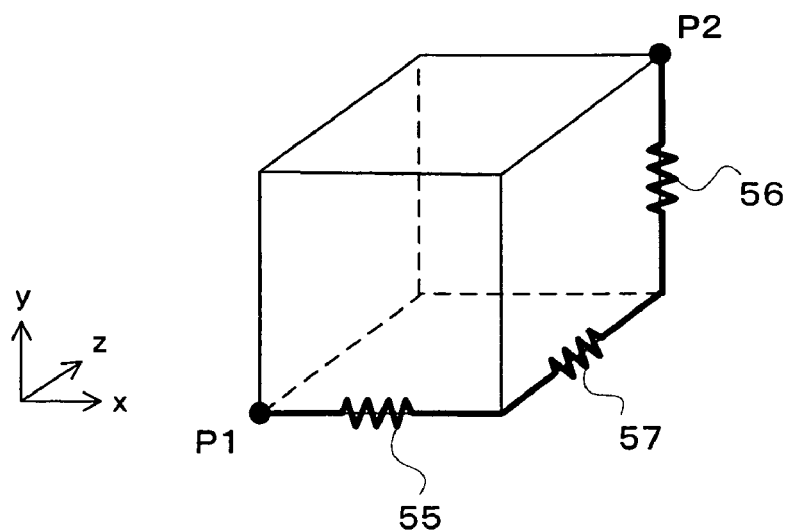
FIG. 28 shows virtual springs set between apexes of a three-dimensional shape model.

In the above embodiment, a two-dimensional shape model located on a two-dimensional rectangular coordinate system is deformed. For deforming a three-dimensional shape model located on a three-dimensional rectangular coordinate system, the same processing is applicable. FIG. 28 shows virtual springs set between apexes of a three-dimensional shape model. When dealing with a three-dimensional shape model, the number of virtual springs which are set between a pair of apexes is the same as the number of dimensions of the rectangular coordinate system. Namely, three virtual springs are set between a pair of apexes. In FIG. 28, a virtual spring 55 in the x axis direction, a virtual spring 56 in the y axis direction and a virtual spring 57 in the z axis direction are set between a pair of apexes P1 and P2. When dealing with a three-dimensional shape model, z direction position determination processing needs to be executed in addition to the x direction position determination processing (step 84) and the y direction position determination processing (step 85). The z direction position determination processing is substantially the same as the processing in step 84.

Figure 29:
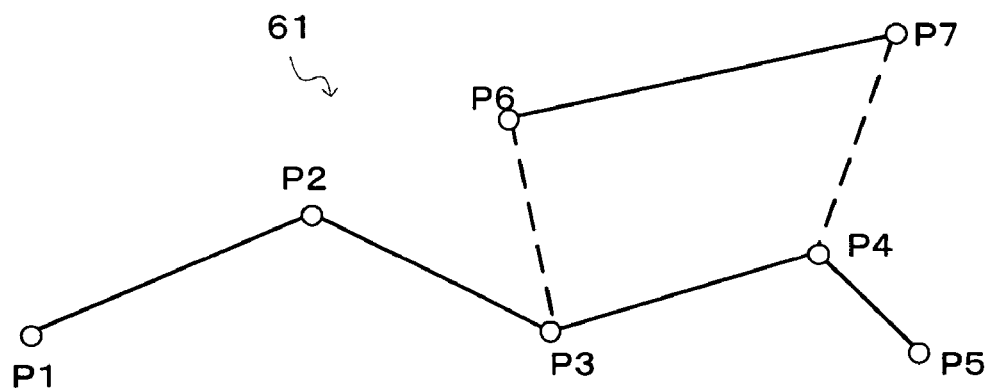
FIG. 29 shows another exemplary shape model.

In this embodiment, a shape model in which all the apexes are connected by line segments is described. Namely, in the shape model shown in FIG. 4 and the like, all the apexes can be reached by following the line segments from an arbitrary apex. It is not necessary that all the apexes of a shape model are connected by line segments. FIG. 29 shows another exemplary shape model 61. The shape model 61 shown in FIG. 29 includes a part in which apexes P1 through P5 are sequentially connected by line segments, and a part in which apexes P6 and P7 are connected by a line segment. (The shape model 61 may be considered to be two shape models including one shape model in which apexes P1 through P5 are sequentially connected by line segments, and another shape model in which apexes P6 and P7 are connected by a line segment.) With such a shape model, in the apex association processing (step 12), virtual springs are set between each pair of apexes connected by a line segment, and virtual springs are also set to connect the above two parts. Namely, virtual springs can be set such that all the apexes can be reached by following virtual springs from an arbitrary apex. In the example shown in FIG. 29, a virtual spring is set between the apexes P3 and P6 and another virtual spring is set between the apexes P4 and P7. As shown in FIG. 29, a shape model may include two separate portions. Accordingly, even when a graphic or a letter (e.g., a Chinese character) including a plurality of portions which are not connected to each other is input by the player, such a graphic or letter can be deformed as the shape model.

Figure 30A:
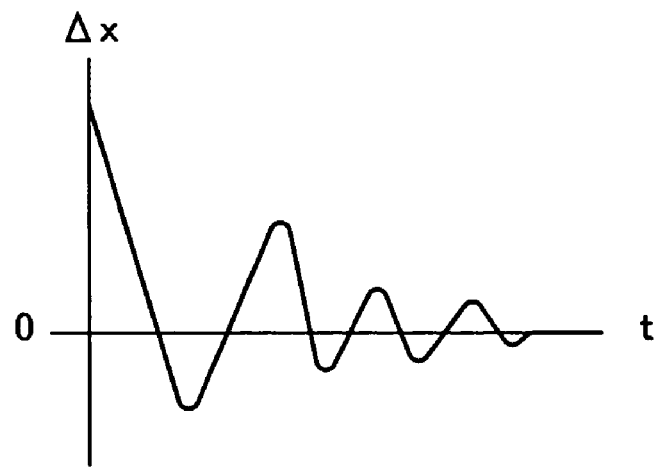
Figure 30B:
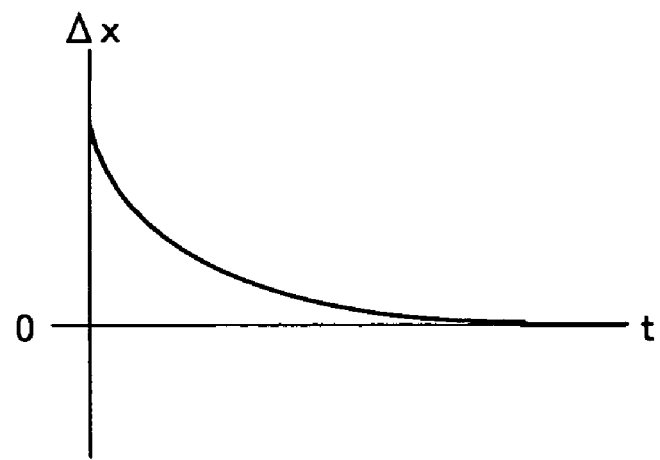

FIG. 30A and FIG. 30B are graphs illustrating the extension of a virtual spring and the time. In FIG. 30A and FIG. 30B, the vertical axis represents the extension of the virtual spring ($\Delta x$) and the horizontal axis represents the time (t). The apexes of the shape model are each considered to behave as gradually approaching the immediately previous apex while vibrating as in FIG. 30A or behave as simply gradually approaching the immediately previous apex without vibrating as in FIG. 30B. In which manner each apex behaves varies in accordance with the manner in which various constants including the spring coefficient or attenuation coefficient of the virtual spring, the mass of the apex, and the air resistance are set. Each constant may be set such that the apex behave in either manner.

The exemplary embodiment presented herein is applicable to an image processing device for processing a shape model so as to deform like an elastic body or an image processing program executed by the image processing device.

While an exemplary embodiment has been described in detail, the foregoing description is in all aspects illustrative and not restrictive. It is understood that numerous other modifications and variations can be devised without departing from the scope of the exemplary embodiment.

What is claimed is:

1. A storage medium having an image processing program stored therein for causing a computer to execute processing of changing the shape of a shape model in a rectangular coordinate system and displaying the shape model on a screen of a display device, wherein:

said shape model comprises a plurality of line segments, each line segment defined between two adjacent apexes at the two ends of each line segment, with no other apexes located between said two adjacent apexes, and each of the apexes of the shape model is associated with at least one other apex of the shape model;

wherein at least two virtual springs are set between each pair of adjacent apexes located at the two ends of each line segment, each spring oriented along a different of two axes of a rectangular coordinate system and applying a force to the two apexes, wherein the two virtual springs are independent from each other, and wherein the force is directed along the axis corresponding to the orientation of the spring and is changed in magnitude in accordance with a change in distance between the two apexes along the corresponding axis; and the image processing program causes the computer to execute:

difference calculation for, when positional relationship between the apexes of the shape model is changed from that of a reference state, calculating a difference between the post-change distance between the two apexes and the distance therebetween in the reference state for each of coordinate components;

spring force calculation for calculating a magnitude of a virtual force generated by each of virtual springs based on the difference;

apex force calculation for calculating a virtual force received by each apex from the corresponding virtual springs for each coordinate component by adding parallel forces among the virtual forces applied to each apex;

position determination for determining a position to which each apex is to be moved for each coordinate component, based on the virtual force calculated for each coordinate component in the apex force calculation; and display control for displaying the shape model obtained by moving each apex thereof to the determined position on the screen.

2. A storage medium according to claim 1, wherein the image processing program causes the computer to further execute:

control point designation for designating at least one apex of the shape model as a control point; and control point movement for moving the control point;

wherein the difference calculation calculates the difference generated by the movement of the control point.

3. A storage medium according to claim 2, wherein, when the control point is designated in the control point designation, the image processing program causes the computer to further execute a control point association for newly associating the control point and each apex of the shape model other than the control point.

4. A storage medium according to claim 3, wherein the control point association performs the new association until the movement of the control point in the control point movement is completed, or until deformation of the shape model caused by the movement of the control point is stopped.

5. A storage medium according to claim 1, wherein the image processing program causes the computer to further execute:
- input detection for detecting a locus drawn by a user on an input plane of an input device as coordinate points in time series; and
- model creation for creating the shape model having at least a part of the detected coordinate points as apexes.

6. A storage medium according to claim 5, wherein:
- the input detection detects the coordinate points sequentially input by the player as a group of coordinate points;
- the model creation creates the shape model including at least a part of the group of coordinate points detected in the input detection as apexes and line segments connecting the apexes in time series; and
- the image processing program causes the computer to further execute apex association for associating a pair of apexes connected by a line segment among a plurality of pairs of apexes included in the shape model created in the model creation.

7. A storage medium according to claim 1, wherein:
- the shape model includes a plurality of apexes and line segments connecting the apexes; and
- the image processing program causes the computer to further execute apex association for, when there is an apex in the shape model which cannot be reached by following the line segments from a predetermined apex, associating the apex which cannot be reached and an apex which can be reached by following the line segments from the predetermined apex.

8. A storage medium according to claim 1, wherein the spring force calculation calculates a virtual force generated by each virtual spring based on a force having a magnitude in proportion to the difference and a force having a magnitude in proportion to a velocity of each apex.

9. A storage medium according to claim 1, wherein the image processing program causes the computer to further execute:
- reference distance calculation for calculating the distance between the two apexes when the shape model is in the reference state for each coordinate component of the rectangular coordinate system; and
- post-movement distance calculation for calculating the distance between the two apexes at a given time after the apexes are moved from the reference state for each coordinate component;
- wherein the difference calculation calculates the difference based on the distance calculated in the reference distance calculation and the distance calculated in the post-movement distance calculation.

10. An image processing apparatus for changing the shape of a shape model in a rectangular coordinate system and displaying the shape model on a screen of a display device, wherein:
- said shape model comprises a plurality of line segments, each line segment defined between two adjacent apexes at the two ends of each line segment, with no other apexes located between said two adjacent apexes,
- each of the apexes of the shape model is associated with at least one other apex of the shape model;
- wherein at least two virtual springs are set between each pair of adjacent apexes located at the two ends of each ling segment, each spring oriented along a different of two axes of a rectangular coordinate system and applying a force to the two apexes, wherein the two virtual springs are independent from each other, and wherein the force is directed along the axis corresponding to the orientation of the spring and is changed in magnitude in accordance with a change in distance between the two apexes along the corresponding axis; and
- the image processing apparatus comprises:
- difference calculation programmed logic circuitry for, when positional relationship between the apexes of the shape model is changed from that of a reference state, calculating a difference between the post-change distance between the two apexes and the distance therebetween in the reference state for each of coordinate components;
- spring force calculation programmed logic circuitry for calculating a magnitude of a virtual force generated by each of virtual springs based on the difference;
- apex force calculation programmed logic circuitry for calculating a virtual force received by each apex for each coordinate component by adding parallel forces among the virtual forces applied to each apex;
- position determination programmed logic circuitry for determining a position to which each apex is to be moved for each coordinate component, based on the virtual force calculated for each coordinate component by the apex force calculation programmed logic circuitry; and
- display control programmed logic circuitry for displaying the shape model obtained by moving each apex thereof to the determined position.

\* \* \* \* \*